United States Patent
Tsurusaki et al.

(10) Patent No.: US 11,013,992 B2
(45) Date of Patent: May 25, 2021

(54) COMPUTER SYSTEM AND GAME SYSTEM

(71) Applicants: BANDAI NAMCO ENTERTAINMENT INC., Tokyo (JP);
TECOTEC INC., Tokyo (JP)

(72) Inventors: Hiroshi Tsurusaki, Tokyo (JP);
Kazumi Tsuchiya, Tokyo (JP); Akira Togawa, Tokyo (JP)

(73) Assignees: BANDAI NAMCO ENTERTAINMENT INC., Tokyo (JP);
TECOTEC INC., Tokyo (JP)

( * ) Notice: Subject to any disclaimer, the term of this patent is extended or adjusted under 35 U.S.C. 154(b) by 0 days.

(21) Appl. No.: 16/587,112

(22) Filed: Sep. 30, 2019

(65) Prior Publication Data

US 2020/0023273 A1    Jan. 23, 2020

Related U.S. Application Data

(63) Continuation of application No. PCT/JP2018/013277, filed on Mar. 29, 2018.

(30) Foreign Application Priority Data

Mar. 31, 2017    (JP) .............................. JP2017-071410

(51) Int. Cl.
*A63F 13/30* (2014.01)
*A63F 13/56* (2014.01)
*G07F 17/32* (2006.01)

(52) U.S. Cl.
CPC .............. *A63F 13/30* (2014.09); *A63F 13/56* (2014.09); *G07F 17/3225* (2013.01)

(58) Field of Classification Search
CPC ....... G07F 17/3225; A63F 13/30; A63F 13/56
See application file for complete search history.

(56) References Cited

U.S. PATENT DOCUMENTS

| 8,540,566 B2 * | 9/2013 | Gregory-Brown ... A63F 13/822 463/25 |
| 9,582,965 B1 * | 2/2017 | Schultz .............. G06Q 30/0209 |

(Continued)

FOREIGN PATENT DOCUMENTS

| JP | 2013-198544 A | 10/2013 |
| JP | 2014-008239 A | 1/2014 |

(Continued)

OTHER PUBLICATIONS

Jun. 5, 2018 International Search Report issued in International Patent Application No. PCT/JP2018/013277.

*Primary Examiner* — Steve Rowland
(74) *Attorney, Agent, or Firm* — Oliff PLC

(57) ABSTRACT

Among game elements, such as a character and an item, use status of a game element of a specific type or property (comprehensively "specific item") is monitored. For example, the use status is monitored with respect to various monitoring parameters related to a transaction between users, a fusion, use in a game, or the like, of the game element. Then, when one or more of the monitoring parameters satisfy a predetermined adjustment support condition, an adjustment support control to increase a use quantity of the specific item of a monitoring target is performed. The use quantity of the specific item includes, for example, an available quantity of the specific item in the game or a total number of specific items that can be possessed and acquired by players.

22 Claims, 27 Drawing Sheets

(56) References Cited

U.S. PATENT DOCUMENTS

| | | | |
|---|---|---|---|
| 2007/0129148 A1* | 6/2007 | Van Luchene | G07F 17/3255 |
| | | | 463/42 |
| 2007/0270226 A1* | 11/2007 | York | A63F 13/48 |
| | | | 463/43 |
| 2011/0092286 A1* | 4/2011 | Bradbury | A63F 13/02 |
| | | | 463/31 |
| 2011/0230258 A1* | 9/2011 | Van Luchene | A63F 13/77 |
| | | | 463/29 |
| 2013/0252689 A1 | 9/2013 | Nashida | |
| 2014/0357345 A1* | 12/2014 | Santini | A63F 13/61 |
| | | | 463/25 |
| 2016/0271487 A1* | 9/2016 | Crouse | A63F 1/00 |

FOREIGN PATENT DOCUMENTS

| | | |
|---|---|---|
| JP | 2015-104411 A | 6/2015 |
| JP | 2016-16324 A | 2/2016 |
| JP | 2016-55056 A | 4/2016 |
| JP | 2017-12424 A | 1/2017 |

\* cited by examiner (1)

(2)

COMPUTER SYSTEM AND GAME SYSTEM

CROSS REFERENCE TO RELATED APPLICATION

This application is a continuation of International Patent Application No. PCT/JP2018/013277, having an international filing date of Mar. 29, 2018, which designated the United States, the entirety of which is incorporated herein by reference. Japanese Patent Application No. 2017-071410 filed on Mar. 31, 2017 is also incorporated herein by reference in its entirety.

BACKGROUND

In many games, a user or a player can own items acquired in relation to the games, and selectively use them. For example, in a Roll Playing Game (RPG), the player can equip a player character with a stronger item so as to make the player character stronger while clearing game stages, which is an important factor to enjoy the game.

The same can be said of, for example, a character selectively used as the player character, as well as the so-called item. Specifically, an important factor to enjoy a competition game including organizing a deck with characters is to acquire and own stronger characters through a competition result, a "gacha" lottery system, an online shop, a character fusion, and the like, so as to organize a stronger deck.

Accordingly, attractiveness of the game depends on how and how much to provide the user with game elements such as the item and the character which are owned and selectively used by each user. Thus, game makers have been making efforts to devise a method for dealing with these elements so as to enhance attractiveness of their game titles.

For example, Japanese Unexamined Patent Application Publication No. 2017-12424 discloses a technique to eliminate a loss of an opportunity for acquiring an item or the like related to a skipped game progress management unit in a game of a stage clear type in which a player sequentially plays a game and progresses the game progress management unit such as a stage, a map, a chapter and the like.

Unfortunately, there is no technique in computer control to control a "use quantity in a game" of the item or the character of each user playing the game. If any, there are some systems in which a winning probability of a so-called "gacha" lottery is changed or in which a limited item and a limited character are given to the player on some kind of conditions. However, both of the systems are manually set by game administrators. Moreover, the purpose of these systems is often to liven up the game (for example, to cause the number of login to increase). The winning probability of the gacha is not changed based on the "use quantity in the game" of the game element such as the item or the character possessed or used by each user.

The item and the character possessed or used by the user are basically given to the user on a predetermined fixed condition or fixed probability in most of the systems. Unfortunately, such systems require to manually determine and set, at a suitable timing in an appropriate way, how to change the winning probability of the gacha (lottery) and what kind of the limited item or the limited character can be given, depending on various stages such as an initial stage where the game has been just released and the number of users are small, a stage where the game starts gaining popularity and the number of users is drastically increasing, a stage where more than a certain number of skilled users with advanced play level exist, and the like. A loss of timing due to wrong determination may soon lead to a loss in popularity. In addition, since there is no concept of the "use quantity in the game", giving the item or the character does not always increase the "use quantity in the game".

It is preferable that a giving control of the item or the character be performed in such a manner that all users, regardless of beginners or skilled users, can maintain or enhance motivation to play the game. The giving control of the item and the character that can maintain or enhance the motivation to play the game naturally leads to an increase (or no decrease) in the "use quantity in the game" of the item or the character.

DESCRIPTION OF EXEMPLARY EMBODIMENTS

Figure 1:
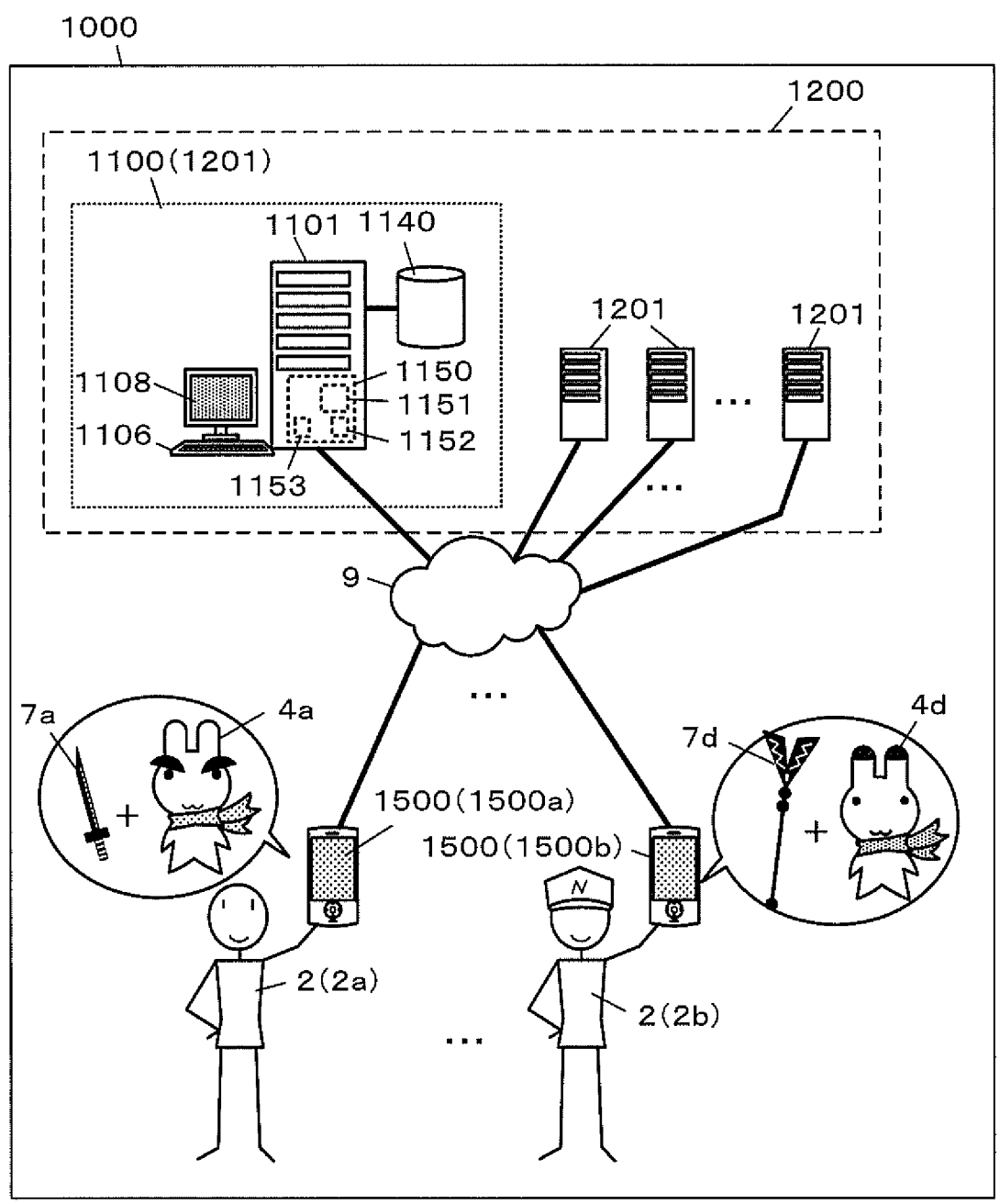
FIG. 1 is a diagram illustrating an example of a configuration of a game system.

The following disclosure provides many different embodiments, or examples, for implementing different features of the provided subject matter. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed. Further, when a first element is described as being "connected" or "coupled" to a second element, such description includes embodiments in which the first and second elements are directly connected or coupled to each other, and also includes embodiments in which the first and second elements are indirectly connected or coupled to each other with one or more other intervening elements in between.

In accordance with one of some embodiments, there is provided a computer system comprising:

at least one processor or circuit programmed to execute as:

monitoring use status of a game element possessed by a user so as to monitor a use quantity of the game element in a game played on a user terminal, the game element being an item and/or a character; and performing a use quantity adjustment support control in which whether to give the game element to the user at a predetermined acquiring opportunity is controlled based on a giving condition based on the use quantity, the predetermined acquiring opportunity being determined as an acquirable opportunity of the game element in the game.

The "computer system" as used herein may be a system including a single computer or may be a system including a plurality of computers in communicable connection with each other.

As a result, in some embodiments, use status and a use quantity of a game element can be monitored. When a giving condition is satisfied, the game element can be given to a user at a predetermined acquiring opportunity. Thus, a technique to implement automatic adjustment of the use quantity of the game element can be provided.

In accordance with one of some embodiments, there is provided the computer system, wherein the at least one processor or circuit may be programmed to further execute controlling a transaction of game elements between a plurality of users based on operation input by the plurality of users, wherein the monitoring of the use quantity may include monitoring the use status including the transaction, and wherein the use quantity adjustment support control may include performing the use quantity adjustment support control with at least one of the game elements that have been targets of the transaction as a control target.

As a result, in some embodiments, a system for transacting the game elements between the plurality of users is provided, while the use status of the transaction is monitored, and the use quantity adjustment support control is executed in relation to at least one of the game elements that have been targets of the transaction. Thus, for example, by executing a giving control of the at least one of the game elements of the transaction targets to increase the use quantity of the at least one of the game elements, opportunities to increase transactions of the at least one of the game elements can be further increased. As a result, the use quantity of the game element can be increased.

In accordance with one of some embodiments, there is provided the computer system, wherein the at least one processor or circuit may be programmed to further execute controlling a fusion of game elements possessed by the user based on operation input by the user, wherein the monitoring of the use quantity may include monitoring the use status including the fusion, and wherein the use quantity adjustment support control may include performing the use quantity adjustment support control with at least one of the game elements that have been targets of the fusion as a control target.

As a result, in some embodiments, a system for fusing the game elements can be provided, while the use status of the fusion can be monitored, and the use quantity adjustment support control can be executed in relation to at least one of the game elements that have been targets of the fusion. Thus, for example, by executing the giving control of the at least one of the game elements of the fusion targets to increase the use quantity of the at least one of the game elements, opportunities to cause the fusion of the at least one of the game elements to be performed can be increased. As a result, the use quantity of the game element can be increased.

In accordance with one of some embodiments, there is provided the computer system, wherein the monitoring of the use quantity may include monitoring the use status including whether each game element possessed by the user has been used in a gameplay, and wherein the use quantity adjustment support control may include performing the use quantity adjustment support control with the game element used in the gameplay as a control target.

As a result, in some embodiments, the use status of the game element in a gameplay can be monitored, and the use quantity adjustment support control can be executed in relation to the game element used in the gameplay. Thus, for example, by executing the giving control of the game element used in the gameplay to increase the use quantity of the game element used in the gameplay, opportunities to cause the game element to be used can be further increased. As a result, the use quantity of the game element can be increased.

In accordance with one of some embodiments, there is provided the computer system, wherein the monitoring of the use quantity may include monitoring the use status of a specific game element among game elements, and monitoring the use quantity of the specific game element, and wherein the use quantity adjustment support control may include controlling whether to give the specific game element at the acquiring opportunity.

As a result, in some embodiments, for example, the specific game element such as the game element with high rarity, and the game element that is presumed to gain popularity from the beginning due to a relation to a previous game title can be monitored, and the use quantity adjustment support control can be executed by controlling whether to give the specific game element. By limiting a target game element to the specific game element, instead of all the game elements, a load of processing can be reduced. In other words, it is possible to limit the target game element of the use quantity adjustment support control to the specific game element, and exclude the other game elements.

In accordance with one of some embodiments, there is provided the computer system, wherein the use quantity adjustment support control may include controlling whether to give a specific game element at the acquiring opportunity so as to perform the use quantity adjustment support control related to the specific game element.

As a result, in some embodiments, the specific game element can be naturally given to the user at an acquiring opportunity when the game element is originally acquirable in the game.

As a specific example of the acquiring opportunity, a lottery called "gacha" can be assumed.

In accordance with one of some embodiments, there is provided the computer system,
wherein the acquiring opportunity may include an opportunity to execute a lottery, and
wherein the use quantity adjustment support control may include changing a winning probability of the specific game element in the lottery so as to perform the use quantity adjustment support control related to the specific game element.

In accordance with one of some embodiments, there is provided the computer system, wherein the use quantity adjustment support control may include changing the winning probability of the specific game element per execution of the lottery, or changing the winning probability of the specific game element in the lottery by performing a control for changing a number of specific game elements to be included in winning candidates.

Another assumed example of the acquiring opportunity is a timing when game progress reaches a predetermined pause in the game title such as stage clearing, dungeon clearing, a result announcement, arrival at a predetermined point on a game map, a change in seasons, years or months in a game space, and an end of a championship season.

In accordance with one of some embodiments, there is provided the computer system, wherein the acquiring opportunity may include a timing when game progress reaches a predetermined pause timing.

In accordance with one of some embodiments, there is provided the computer system,
wherein the specific game element may include a first specific game element and a second specific game element,
wherein the monitoring of the use quantity may include monitoring respective use quantities of the first specific game element and the second specific game element, and
wherein the use quantity adjustment support control may include performing the use quantity adjustment support control in which the giving condition based on the use quantity of the first specific game element and the giving condition based on the use quantity of the second specific game element are different.

As a result, in some embodiments, the first specific game element and the second specific game element, which are different in type or property (including rarity, categories based on game rules, and the like, set to the game element), can be respectively monitored, and the use quantity adjustment support control can be executed on different giving conditions for respective specific game elements.

In accordance with one of some embodiments, there is provided the computer system,
wherein the at least one processor or circuit may be programmed to further execute determining game activity based on at least any one of a player level, play time, a play frequency, a number of types of game elements in possession, and a number of game elements in possession, of each of the users, and
wherein the use quantity adjustment support control may include performing the use quantity adjustment support control with the game activity included in the giving condition.

In accordance with one of some embodiments, there is provided the computer system, wherein the determination of the game activity may include determining the game activity further using statistical information of users.

The player level, the play time, the play frequency, the number of types of the game elements in possession, and the number of game elements in possession of each of the users and statistical information of the users (such as a total number, age distribution, a male-to-female ratio, an average number of users per day) indirectly show whether the game title is active, or whether the game is livening up.

As a result, in some embodiments, the use quantity adjustment support control of the game element can be performed according to the game activity or a livening-up degree of the game.

In accordance with one of some embodiments, there is provided the computer system, wherein the at least one processor or circuit may be programmed to further execute a control for notifying the user of the use quantity.

As a result, in some embodiments, information on the use quantity of the game element can be informed to the user.

In accordance with one of some embodiments, there is provided the computer system, wherein the use quantity adjustment support control may further include controlling a giving quantity of the game element when the game element is given.

As a result, in some embodiments, the giving quantity of the game element can be controlled. For example, assuming that a first game element (such as a portable stove) that consumes energy and a second game element (such as a gas cartridge) serving as an energy source are given. It is possible to give the former one at a time and the latter a quantity (such as three gas cartridges) enough to operate the first game element for a certain period of time at a time. That is, the giving quantity can be set depending on how the game element is used.

In accordance with one of some embodiments, there is provided the computer system, wherein the use quantity adjustment support control may include a control for giving a game element associated with the game element of a monitoring target based on the use quantity.

As a result, in some embodiments, the game element to be given is not limited to the game element of a monitoring target, but another game element associated with the game element of the monitoring target can be given. For example, when a game element of a certain type with a certain rarity is monitored, another game element that has the same rarity but is of a different type can be given depending on a monitoring result. More specifically, this configuration enables performing control in which, when the use quantity of the game element of the certain type reaches a certain level, another game element that has the same rarity, but of a new type is added to the game to appear.

In accordance with one of some embodiments, there is provided the computer system, wherein the at least one processor or circuit may be programmed to further execute managing operation input related to the game by each of the users by a predetermined block chain process.

As a result, in some embodiments, every user can play the game while ensuring his/her validity of the operation input related to the game. For example, fraud can be prevented in the transaction and the fusion of the game elements, so that fair game management can be provided.

In accordance with one of some embodiments, there is provided a game system comprising:

a user terminal on which the user performs operation input related to the game; and a server system that is the computer system as defined in claim 1, the user terminal and the server system being configured to connect to each other to perform communication.

In accordance with one of some embodiments, there is provided a method, implemented on a computer system, the method comprising: on the computer system, monitoring use status of a game element possessed by a user so as to monitor a use quantity of the game element in a game played on a user terminal, the game element being an item and/or a character; and performing a use quantity adjustment support control in which whether to give the game element to the user at a predetermined acquiring opportunity is controlled based on a giving condition based on the use quantity, the predetermined acquiring opportunity being determined as an acquirable opportunity of the game element in the game.

Exemplary embodiments are described below. Note that the following exemplary embodiments do not in any way limit the scope of the content defined by the claims laid out herein. Note also that all of the elements described in the present embodiment should not necessarily be taken as essential elements.

FIG. 1 is a diagram illustrating an example of a configuration of a game system according to the present embodiment. A game system 1000 according to the present embodiment is a computer system that includes a server system 1100 configured to connect to a communication line 9 to perform mutual data communication, a block chain system 1200, and a plurality of user terminals 1500 (1500*a*, 1500*b*, . . . ), and is a content providing system that provides game contents.

The communication line 9 is a communication channel that enables data communications. Specifically, the communication line 9 includes a communication network such as a local area network (LAN) using a private line (private cable) for direct connection, Ethernet (registered trademark), and the like, a telecommunication network, a cable network, and the Internet. The communication method may be a cable communication method or a wireless communication method.

The server system 1100 includes a main body device 1101, a keyboard 1106, a touch panel 1108, and a storage 1140. A control board 1150 is disposed in the main body device 1101.

The control board 1150 contains a microprocessor of various types (e.g., a central processing unit (CPU) 1151, a graphics processing unit (GPU)), and a digital signal processor (DSP), an IC memory 1152 of various types (e.g., a video random access memory (VRAM), a random access memory (RAM), and a read only memory (ROM)), and a communication device 1153. The control board 1150 may partially or entirely be implemented with an application specific integrated circuit (ASIC), a field-programmable gate array (FPGA), or a system on a chip (SoC).

Through a calculation process performed by the control board 1150 based on a predetermined program and data, the server system 1100 implements 1) a user management function related to user registration and the like, 2) a game management function of providing data necessary for a player 2 (2*a*, 2*b*, . . . ) to play the game with the user terminals 1500 (1500*a*, 1500*b*, . . . ) to manage execution control on the game played with the user terminals 1500 (1500*a*, 1500*b*, . . . ), 3) an online shopping function of selling objects to be possessed by users such as various items and characters, usable in the game, to users online, 4) a transaction function of exchanging or transact the possessed objects such as the items and the characters between the users, and 5) a communication function of providing communication between the users such as a chat.

The server system 1100 is illustrated/described as a single server. Alternatively, a plurality of blade servers, in charge of various functions, may be installed while being connected to each other via an internal bus to be capable of performing data communications with each other. Furthermore, a plurality of independent servers, disposed in locations distant from each other, may perform data communications with each other via the communication line 9 to function as the server system 1100 as a whole.

The block chain system 1200 is a distributed network system including a plurality of nodes 1201, and especially a distributed ledger system in which the plurality of nodes 1201 store and synchronize the identical data based on the so-called "block chain technique" so that accuracy and tempering resistance of the data is secured. In the present embodiment, a ledger of transactions of the game objects used in the game, such as the characters and items, between the users is stored and synchronized.

The user terminals 1500 (1500*a*, 1500*b*, . . . ) are computer systems individually usable by registered users serving as players 2 (2*a*, 2*b*, . . . ) for gameplay, and are electronic devices (electronic apparatus) that can access the server system 1100 via the communication line 9 to implement an online game. Each of the user terminal 1500 according to the present embodiment is a device known as a smartphone. The user terminal 1500 may also be a portable game device, a game controller, a personal computer, a tablet computer, a wearable computer, an arcade game apparatus, or the like.

Figure 2:
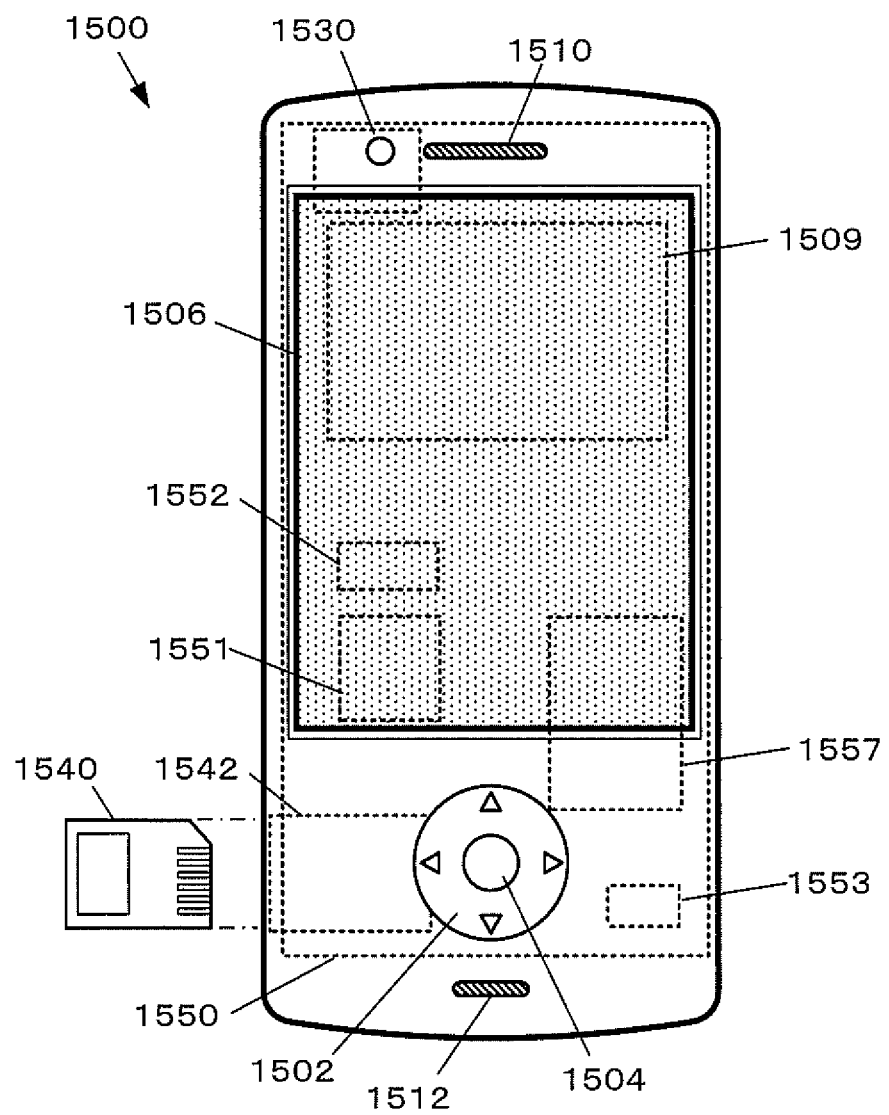
FIG. 2 is a front view of a user terminal, illustrating an example of a configuration thereof.

FIG. 2 is a front view of the user terminal 1500 according to the present embodiment, illustrating an example of a configuration thereof.

The user terminal 1500 includes an arrow key 1502, a button switch 1504, a touch panel 1506 that functions as an image display device and a touch position input device, a speaker 1510, a built-in battery 1509, a microphone 1512, an image sensor unit 1530, a control board 1550, and a memory card reader 1542 that can write and read data on and from a memory card 1540 that is a computer readable storage medium. The user terminal 1500 further includes a power button, a volume control button, and the like (not illustrated). Furthermore, the user terminal 1500 may be provided with an IC card reader that can implement contactless writing and reading of data on and from an IC card, such as a credit card or a prepaid card, usable for payment involved in playing the game.

The control board 1550 includes a microprocessor of various types (e.g., a CPU 1551, a GPU, and a DSP), an IC memory 1552 of various types (a VRAM, a RAM, and a ROM), a wireless communication module 1553 for performing wireless communication with a mobile phone base station, a wireless LAN base station, or the like connected to the communication line 9, an interface circuit 1557, and the like.

The interface circuit 1557 includes, for example, a driver circuit that drives the touch panel 1506, a circuit that receives signals from the arrow key 1502 and the button switch 1504, an output amplifier circuit that outputs a sound signal to the speaker 1510, an input signal generation circuit that generates a signal corresponding to the sound collected by the microphone 1512, a circuit that inputs image data of an image captured by the image sensor unit 1530, and a signal input-output circuit that inputs and outputs a signal to and from the memory card reader 1542.

The elements mounted on the control board 1550 are electrically connected with each other via a bus circuit or the like to be capable of exchanging data and signals. The control board 1550 may partially or entirely be implemented with an ASIC, an FPGA, or a SoC. The control board 1550 stores a program and various types of data, for implementing a function as the user terminal of the game according to the present embodiment, in the IC memory 1552.

A client program and various types of setting data are downloaded by the user terminal 1500 from the server system 1100 in the present embodiment. The program and the data may also be read from a storage medium such as the memory card 1540 additionally provided.

Game Description

Figure 3:
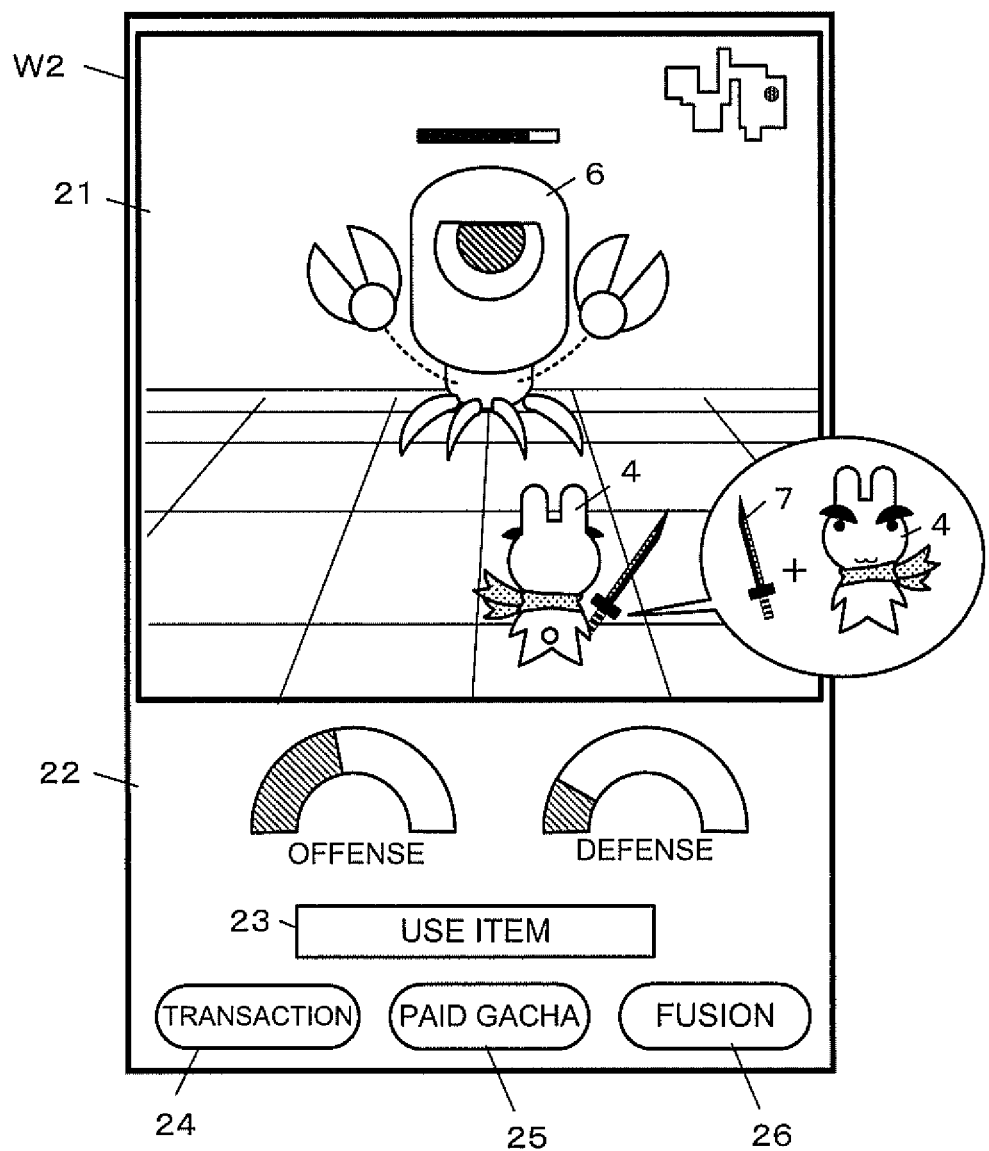
FIG. 3 is a diagram illustrating an outline of a game.

FIG. 3 is a diagram illustrating an outline of the online game serving as content according to the present embodiment. The game according to the present embodiment is an action RPG in which a registered user serving as a player selects a character from characters possessed by the player to use as a player character 4 and fights against an enemy character 6 prepared in various kinds. The game is implemented as one type of client-server online games.

The game screen W2 includes a main display section 21 and an operation icon display section 22.

The main display section 21 shows the player character 4 fighting against the enemy character 6.

The operation icon display section 22 includes an icon for operating movement of the player character 4, an icon 23 for using an item, an icon 24 for a transaction, an icon 25 for a paid gacha, and an icon 26 for a fusion.

The icon 23 for using the item is an operation icon that allows the player to select and use an item possessed by the player during the gameplay.

The icon 24 for the transaction is an operation icon that allows the player to execute the transaction function for exchanging the item possessed by the player for one possessed by another player.

The icon 25 for the paid gacha is an operation icon that allows the player to exercise a right of the paid gacha (or to use a paid gacha ticket) so as to execute the gacha that provides an item 7 or the like as a prize. The gacha is a method for giving an item to the user and it resembles a method for selling capsule toys in which prizes are determined at random.

The icon 26 for the fusion is an operation icon that allows the player to execute an item fusion using items possessed by the player.

The icon 24 for the transaction, the icon 25 for the paid gacha, and the icon 26 for the fusion are not limited to be displayed in the game screen W2, and may be included as menu items in a top menu shown after login along with an icon for starting the gameplay.

The player character 4 is a character selected from the characters possessed by the player to be used as an avatar of the player in the game world. Equipping the player character 4 with an item 7 can improve its fighting strength and defensive strength.

The item 7 is a game object that can be used in the game, and prepared in various kinds. The item 7 is set with rarity (a level of rarity) and a property. Higher rarity is set to have higher ability. The player character 4 equipped with or using the item having higher rarity can be more advantageous while playing the game.

Ability of the player character 4 and part of items 7 such as weapons and protections varies depending on a result of game progress. The ability is managed with parameters represented by a character level indicating growth degree, the fighting strength, the defensive strength, traveling force, resilience, skill, and the like. Note that parameters other than these can be included as appropriate. Then, when the player character 4 is equipped with or uses the item 7, values of the parameters are improved according to an effect setting of the item 7.

Accordingly, the player needs to acquire the character and the item 7 that can make the player character 4 have higher rarity and higher effect so that the player can be more advantageous in the progress of the game or can enjoy the game more.

The character, that can be used as the player character 4, and the item 7 can be acquired in various ways. In the present embodiment, the character and the item can be acquired: 1) by purchasing through an online shopping service provided by the server system 1100; 2) as a prize of the gacha for free at a login timing; 3) as a prize of the paid gacha; 4) by a transaction with other players; 5) by a character fusion or an item fusion, 6) as a prize of a play result; and 7) by offering for free or for a fee in a promotion related to game management. Note that ways other than these may be adopted as appropriate. Alternatively, a configuration including only one or more of these can be employed.

A method for making the player character 4 and the item 7 have higher rarity and effect (or a method for raising or evolving them) gives real pleasure of playing the game.

Accordingly, in the present embodiment, use status of the character and the item 7 with high rarity and effect is monitored, and a support control for performing appropriate adjustment support of a use quantity of the character and the item is performed, for the purpose of improving motivation of the user to enjoy the game longer. The support control can be considered as a control that causes adjustment.

The "use quantity" in the present embodiment is a number of characters or items used in ways such as a transaction, a fusion, and a gameplay. The use quantity does not include a number of characters or items that have been added to the game system, but has been possessed (owned) by the user (player) without use (in a state of so-called savings in a cabinet). However, the use quantity may include the number of characters or items that have been possessed (owned)

without use. In such a case, the use quantity can be obtained from the number of characters or items possessed (owned) by the user (player).

Figure 4:
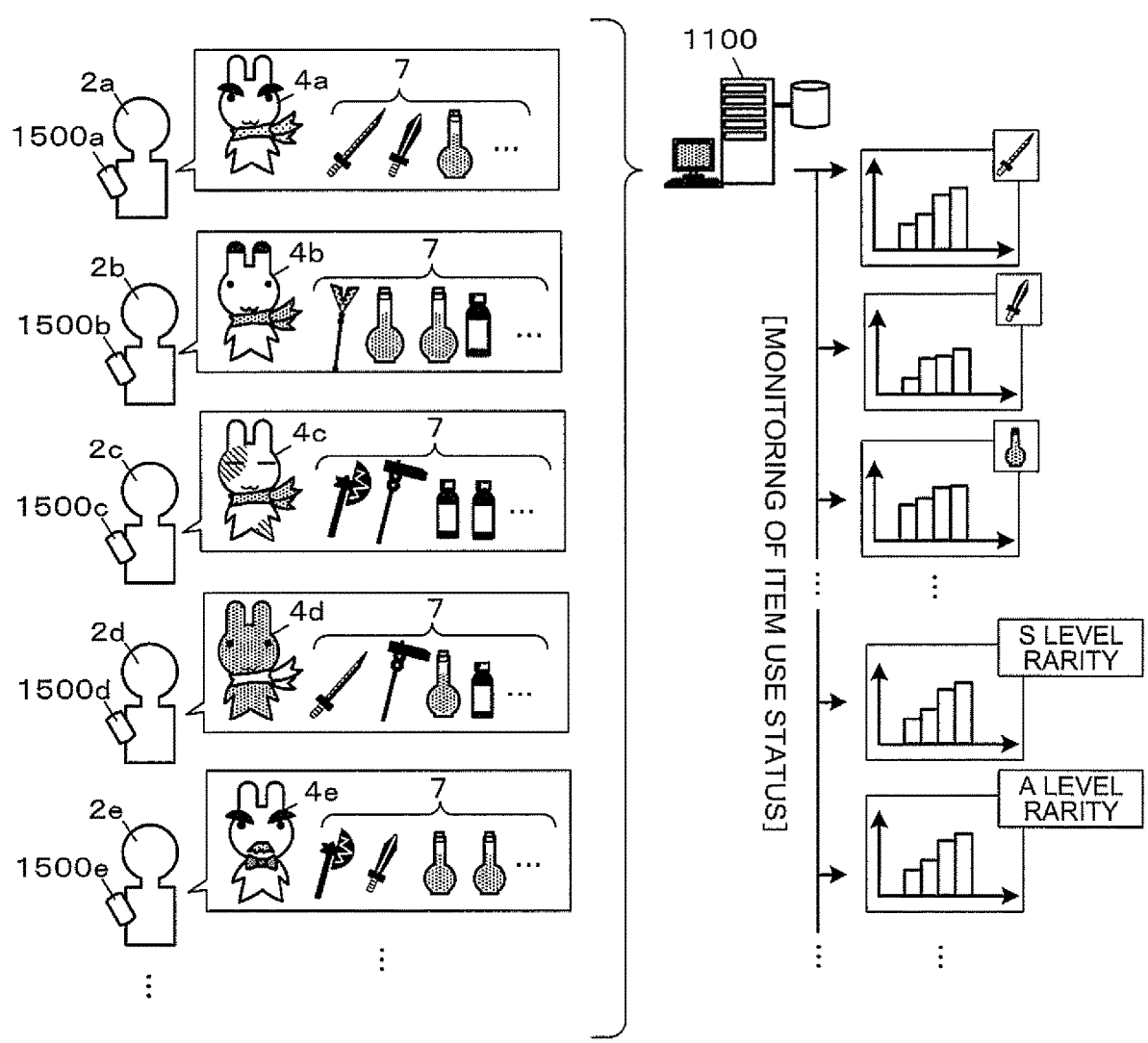
FIG. 4 is a diagram illustrating monitoring of use status of a character, that can be used as a player character, and an item.

FIG. 4 is a diagram illustrating monitoring of the use status of the character, that can be used as the player character 4, and the item 7.

In the present embodiment, the character, that can be used as the player character 4, and the item 7 are possessed and managed by each player 2 as possessed objects. Data of the character and the item 7 possessed by each player are associated with a user account of each player and managed in the server system 1100.

The server system 1100 in the present embodiment can monitor the use status of a game element such as the character, that can be used as the player character 4, and the item 7, and perform a use quantity adjustment support control of the game element depending on the use status. In addition, the server system 1100 can perform the use quantity adjustment support control of the item depending on game activity.

In order to facilitate understanding, the item 7 is exemplified and described hereinafter on behalf of the game element such as the character, that can be used as the player character 4, and the item 7. The same can apply to the character that can be used as the player character 4.

With regard to an item (specific item) of a specific type, "monitoring the use status of the item" is performed for each type and property. A configuration omitting either of them may be employed, of course.

The "specific item" as used herein is an item of a type having relatively higher rarity in the present embodiment, however, the specific item may also include an item having low rarity.

The "property" as used herein means a sub category (such as fire, water, air, electricity, good, and evil) based on the rarity and game rules.

Monitoring the use status of the item 7 is performed mainly in view of: 1) a transaction between players; 2) an item fusion; and 3) use in the game.

Figure 5:
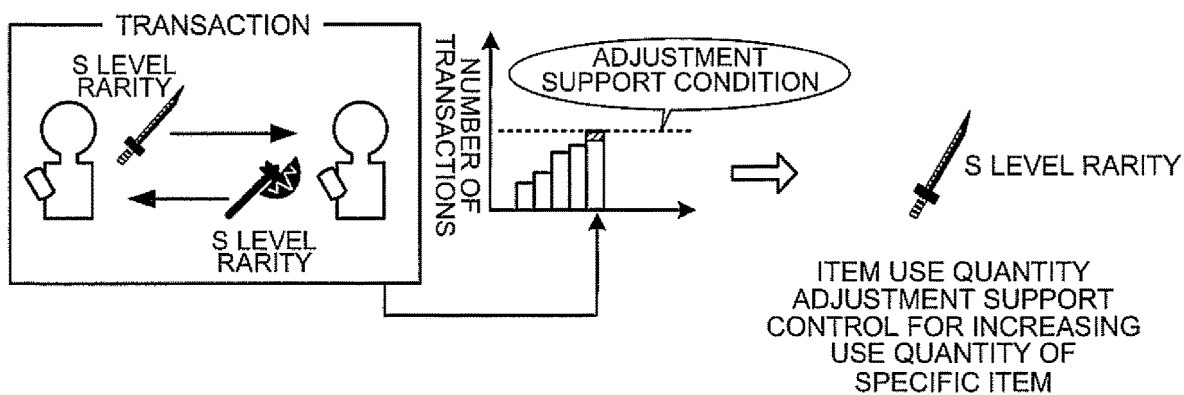
FIG. 5 is a diagram illustrating monitoring of the use status in view of an item transaction and an item use quantity adjustment support control.
Figure 5:
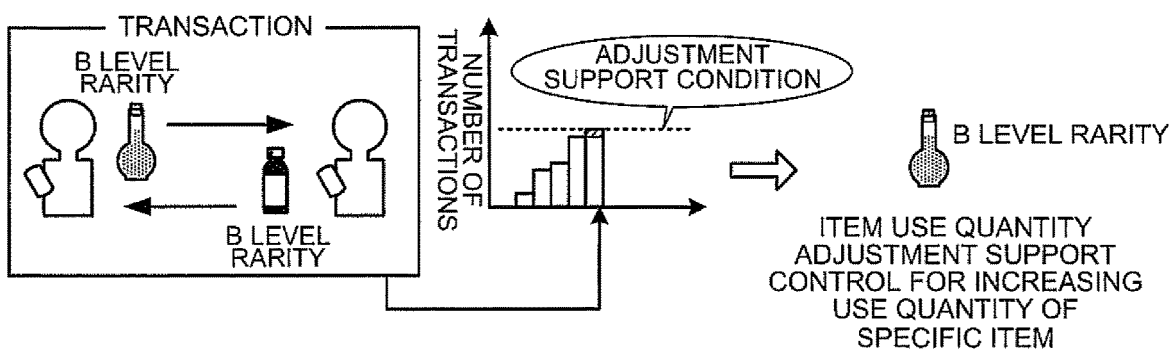

FIG. 5 is a diagram illustrating monitoring of the use status in view of the transaction of the item and an item use quantity adjustment support control.

When a transaction of items 7 is performed between players (2a and 2b), details of the transaction is stored as transaction ledger data. The details of the transaction include information such as transaction date and time, user accounts of the players who performed the transaction, the types of the transacted items, a number of transacted items, and the properties of the transacted items. In the present embodiment, the transaction ledger data including the details of the transaction is stored in and managed by the block chain system 1200.

The server system 1100 monitors, as a monitoring parameter of the use status of the item in view of the transaction, one or more of: a total number of whole transactions, an increasing rate of the number of transactions, a total number of transacted items, a frequency of the transactions, and the like. The monitoring parameter is successively calculated and updated to be monitored, with respect to the whole transactions of items, each type of the specific item, and each property of the specific item.

Then, in the present embodiment, when the monitoring parameter related to the use status satisfies a predetermined adjustment support condition, the item use quantity adjustment support control is performed so as to increase the use quantity of the specific item. The predetermined adjustment support condition is, in other words, a giving condition for executing item giving to the user for the purpose of item use quantity adjustment support control. For example, in the present embodiment, a number of specific items that have been available in the game is increased. Such a control makes the game more active, which leads to the motivation of the user to play the game longer and more actively.

The "adjustment support condition" is defined as an AND condition or an OR condition with respect to one or more of the monitoring parameters associated with the type or the property of the specific item. For example, the condition may be defined as: "a total number of transactions in the whole transactions reaches 10000"; "every time when a total number of whole transactions increases by 1000"; "a total number of transactions of a specific item 'sword of the god of thunder' reaches 20"; or "a total number of transactions of an item with rarity of A level is over 1000 and a transaction frequency reaches 10 times per day".

The "item use quantity adjustment" is implemented by giving the item to the user at a predetermined acquiring opportunity which is determined as an acquirable opportunity of the item in the game. In the present embodiment, the item use quantity adjustment support control is performed to increase the item use quantity, by selecting any one of the following four adjusting methods.

Specifically, the methods include:
1) a so-called "drop" which is left behind when an enemy character 6 is brought down;
2) a "prize" given depending on a play result such as clearing a stage or map;
3) mixing in prizes of the so-called "gacha" which is an item acquiring method adopting a selling method of capsule toys in which prizes are determined at random; and
4) "random deployment" in which an item appears in a game space at random for a certain time period in such a manner that a player can find and acquire it.

Among the four adjusting methods described above, the item can be directly given to the player by the "prize". However, the item is not necessarily given to the player directly at a timing of execution of the use quantity adjustment by the "drop", "gacha", and "random deployment". Thus, these three methods are indirect giving.

As for the type of the specific item added to the game in related to the item use quantity adjustment support control, it is possible to adopt any one or both of: the specific item in use; and a specific item of a new type that has not been available (in other words, one that has never appeared in the game). In the case of the specific item in use, the type may be defined, with an adjustment support condition combined, as: "every time a total number of transactions of a specific item with rarity of S level increases by 100", "any n kind(s) of specific item(s) with rarity of S level that has been already available in the game is increased by m (n and m are natural numbers), for example.

The "acquiring opportunity" as used herein can be set to a pause in the gameplay (such as when a fight is finished or when the player reaches a pause in a scenario), when the "drop" is adopted as the adjusting method, for example.

When the "prize" is adopted as the adjusting method, the acquiring opportunity can be set to a timing when a game result is informed to the player, a timing of stopping the gameplay, a timing of logoff, or the like.

When the "gacha" is adopted as the adjusting method, the acquiring opportunity is when the user executes the gacha, and the adjustment can be implemented by temporarily raising a winning probability of the specific item to be increased. Alternatively, the specific item to be increased may be added to a prize list (winning candidate list) so as to temporarily raise the winning probability of the specific item.

When the "random deployment" on a game map is adopted as the adjusting method, the acquiring opportunity can be set to any timing during the gameplay in addition to the timing of the pause in the gameplay.

Figure 6:
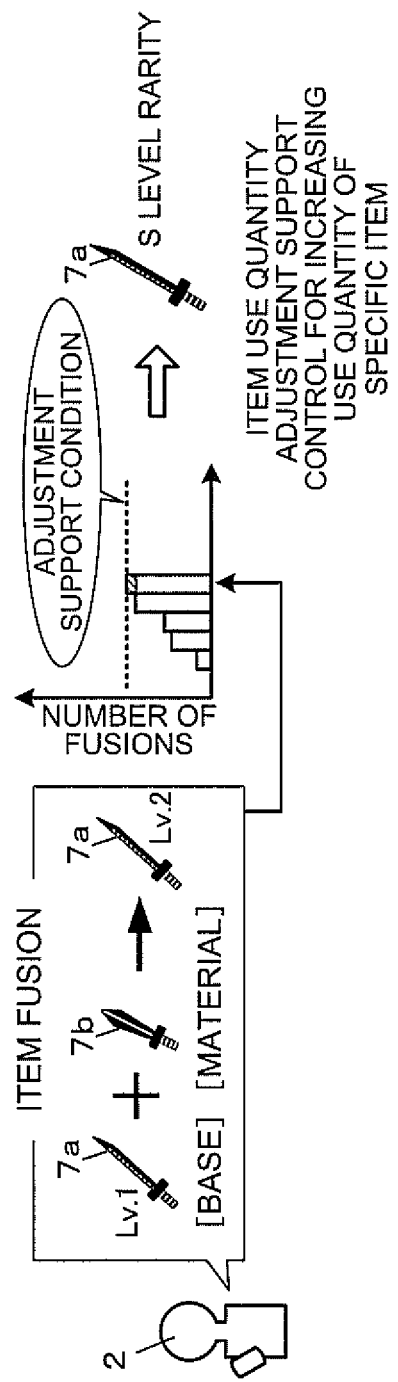
FIG. 6 is a diagram illustrating monitoring of the use status in view of an item fusion and the item use quantity adjustment support control.

FIG. 6 is a diagram illustrating monitoring of the use status in view of the item fusion and item use quantity adjustment support control. The "item fusion" as used herein is performed in accordance with a game rule in which an item designated by operation as material is spent for an item designated by operation as a base. The item fusion can adopt one or more of:
1) a power-up fusion by which the base item is reinforced;
2) an evolving fusion by which the base item is replaced with an item of higher level in the same genealogy; and
3) a replacing fusion by which the base item is replaced with an item of a different type.

Description is given assuming that the power-up fusion is adopted in the present embodiment. Note that the item fusion may be referred to as "production", "development", or the like depending on the content of the game.

When the item fusion is executed on the specific item, the server system 1100 updates and monitors a total number of fusions, an increasing rate of the number of fusions, a frequency of the fusions, and the like, as monitoring parameters for monitoring the use status of the specific item. Then, when the values of the monitoring parameters satisfy a predetermined adjustment support condition related to the item fusion, the use quantity adjustment support control of the specific item is performed. In the present embodiment, the number of specific items that have been available in the game is increased to improve the use quantity.

The "adjustment support condition" related to the item fusion is defined as an AND condition or an OR condition with respect to one or more of the monitoring parameters associated with the type or the property of the specific item. For example, the condition may be defined as: "a total number of fusions reaches 1000", "every time when a total number of fusions increases by 500", "a total number of fusions related to a specific item 'sword of the god of thunder' reaches 20", or "a total number of fusions using an item with rarity of A level as material is over 1000 and a transaction frequency reaches 10 times per day".

Figure 7:
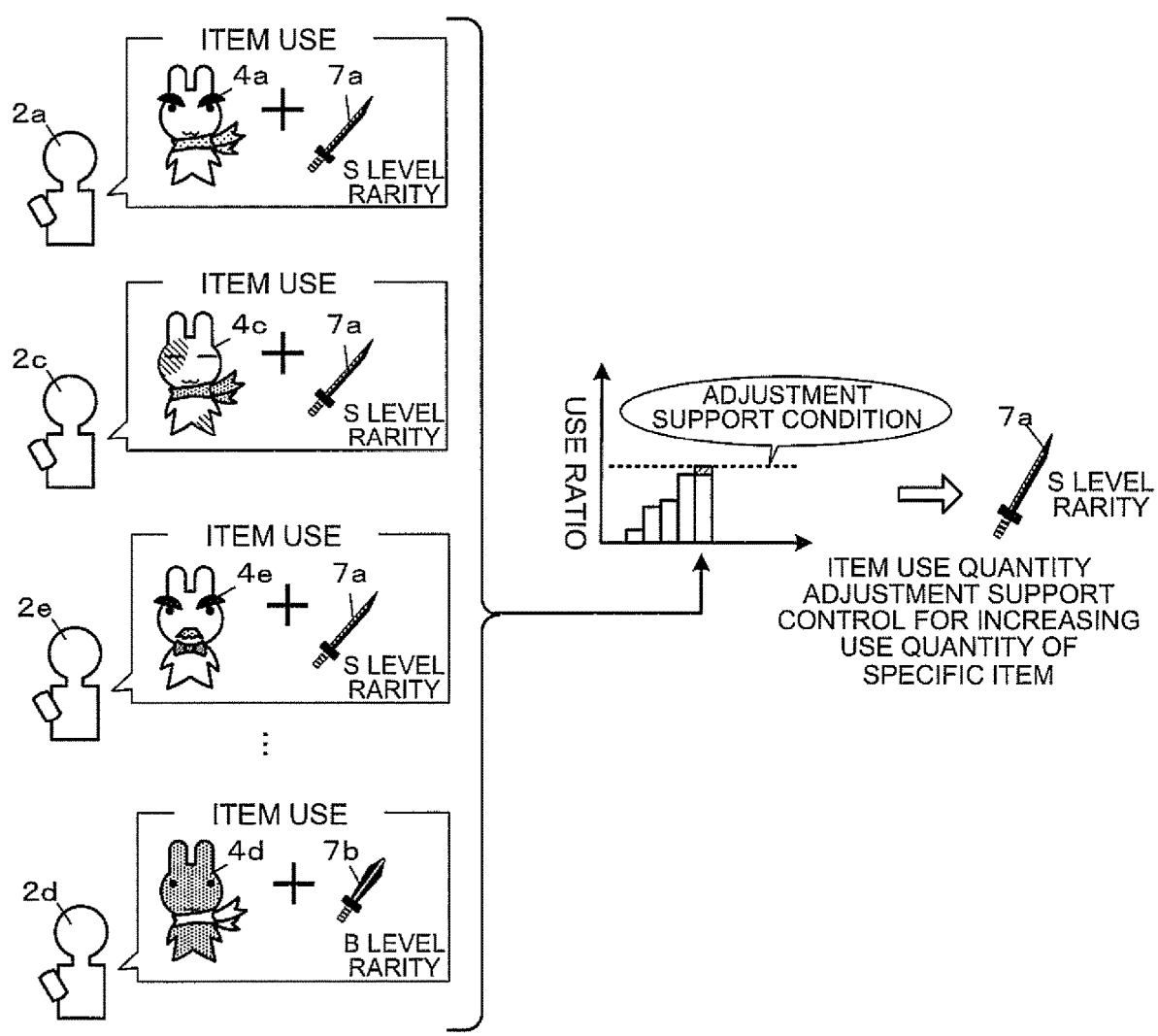
FIG. 7 is a diagram illustrating monitoring of the use status in view of use of a specific item in a gameplay and the item use quantity adjustment support control.

FIG. 7 is a diagram illustrating monitoring of the use status in view of use of the specific item in the gameplay and the item use quantity adjustment. The server system 1100 according to the present embodiment monitors which item 7 the registered user uses in the gameplay. Specifically, in view of the type or property of the specific item, the server system 1100 monitors one or more of:
1) a number of plays using the specific item;
2) an increasing rate of the number of use;
3) a use ratio in all registered users;
4) a ratio of the number of plays using the specific item to a total number of plays, that is, a use frequency;
and the like, as the monitoring parameter. Note that parameters other than these may be monitored.

The "adjustment support condition" related to the use of the specific item can be set as: "a use frequency of a specific item 'armor of Mythril' in the last 10 plays is equal to or higher than 50%."; or "75% or more of the registered users use a specific item 'a medicine herb for full recovery'", for example.

Figure 8:
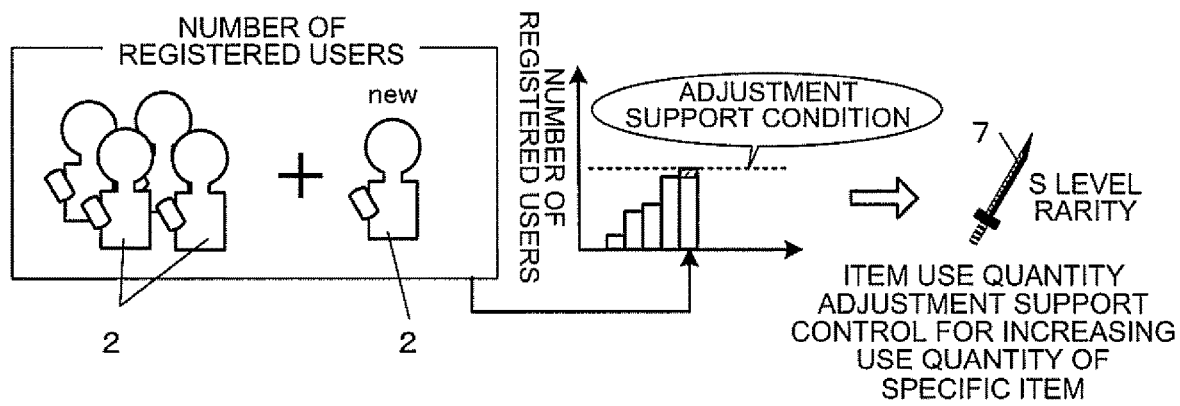
FIG. 8 is a diagram illustrating monitoring of game activity and the item use quantity adjustment support control.
Figure 8:
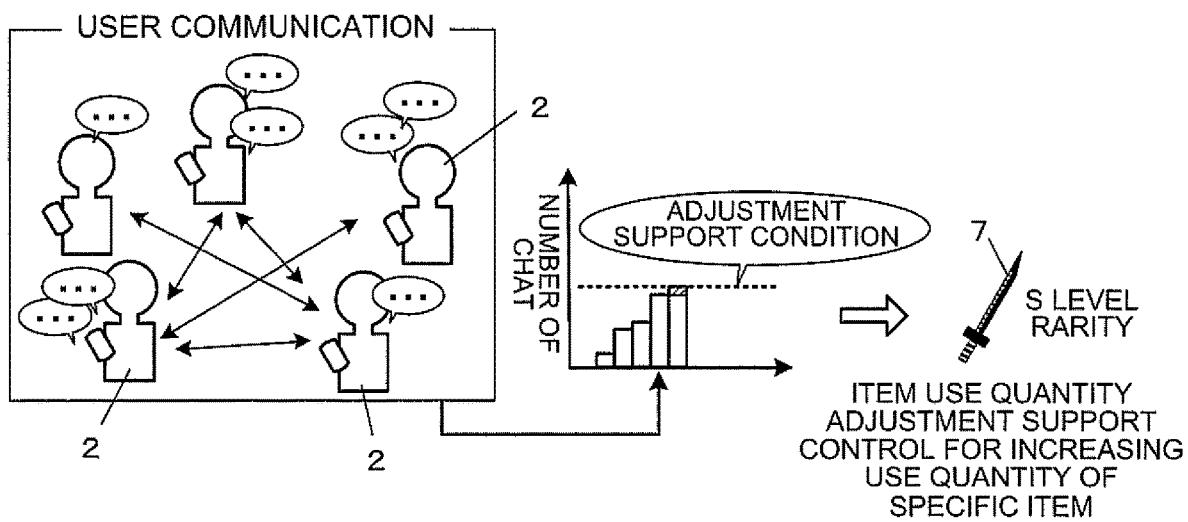

FIG. 8 is a diagram illustrating monitoring of game activity and the item use quantity adjustment support control. The server system 1100 according to the present embodiment monitors the game activity in addition to the item use status. When the game activity satisfies a predetermined adjustment support condition related to the game activity, the server system 1100 executes the item use quantity adjustment support control of the specific item. In the present embodiment, the number of specific items that have been available in the game is increased to improve the item use quantity.

For example, it can be determined that "the game is livening up" or "the activity is high" when the number of registered users continuously increases, when the ratio of the players actively playing the game to all the registered users is high, when communication such as the chat between users is active, and "the registered users actively purchase items".

Accordingly, in the present embodiment, the server system 1100 monitors one or more of parameters such as the number of registered users, an increasing rate of the number of registered users, a play frequency of a registered user, a ratio of frequent players, a number of times and time of the chat, a number of friend registrations, a purchase quantity, a purchase amount, and a number of times of purchase in a predetermined period (for example, in a month), a number of types of items possessed by a user, a number of items possessed by a user, and statistical information of users, so as to determine the "game activity". As for the statistical information of the users, it is possible to use a total number of users, an average number of users (players) per day, a male-to-female ratio, a number of users in each age group, an age composition obtained from the number of users in each age group, and the like.

The adjustment support condition related to the game activity can be set as, for example: "a total number of registered users exceeds 1000"; "every time when a number of registered users increases by 500"; "an increasing rate of a number of registered users is more than 10 per week"; and "a ratio of players of level 10 or higher to all users reaches 20%".

Alternatively, for example, it can be set as: "an average number of chat per registered user reaches 6 times per week"; "an average number of friend registrations per registered user exceeds 10"; or "an item purchase frequency per registered user reaches 3 times per week".

Alternatively, it can be also set as: "an average number of item types possessed by a user exceeds 10"; "an average number of items possessed by a user reaches 100"; "a ratio of a number of item types possessed by all users to a number of all item types reaches 60%"; "a number of items possessed by all users reaches 10000"; "a total number of registered users reaches 20000"; or "a male-to-female ratio of registered users reaches a predetermined range where the ratio is considered to be approximately equalized".

Figure 9:
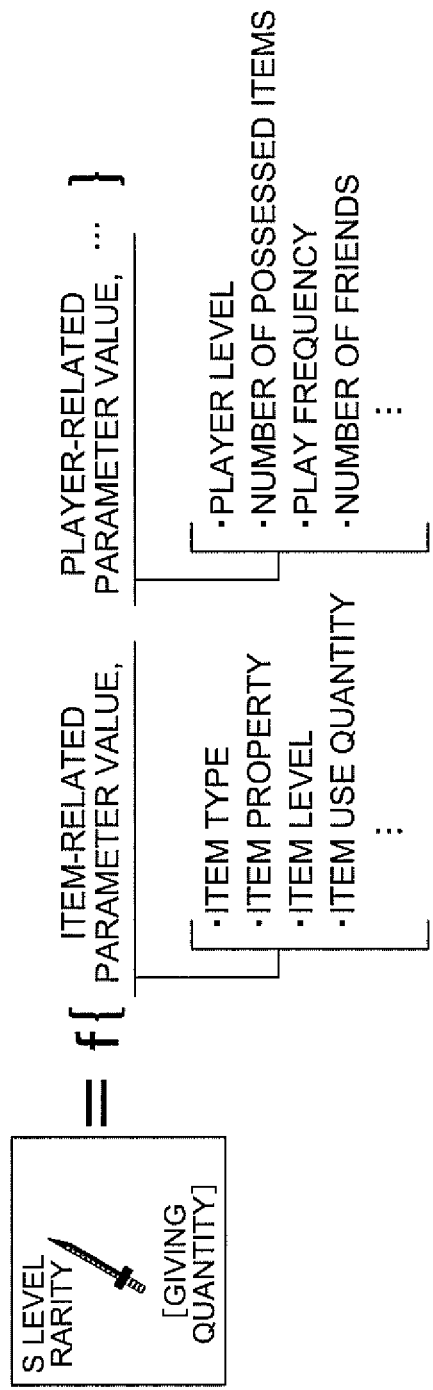
FIG. 9 is a diagram illustrating a setting of a giving quantity of the specific item related to the item use quantity adjustment support control.

FIG. 9 is a diagram illustrating a setting of a giving quantity of the specific item related to the item use quantity adjustment support control according to the present embodiment. In the present embodiment, an additional quantity of the specific item related to the item use quantity adjustment support control, that is, a giving quantity is determined by a predetermined function f for calculating the giving quantity. Variables of the function includes one or both of an item-related parameter value and a player-related parameter value.

The item-related parameter value includes one or more of the parameter values such as the type, the property, an item level, and the use quantity of the specific item that is specified as an adjustment support target.

The player-related parameter value includes one or more of the parameter values such as the player level, the number of possessed items, the play frequency, and the number of friends, each of which corresponds to an average or a median of part or all of the registered users.

The function f for calculating the giving quantity is set such that a higher value of the item-related parameter or the player-related parameter results in a larger giving quantity. The function f for calculating the giving quantity may vary for each type or the property of the specific item of the monitoring target. The function f for calculating the giving quantity can be replaced with one or more of table data.

Figure 10:
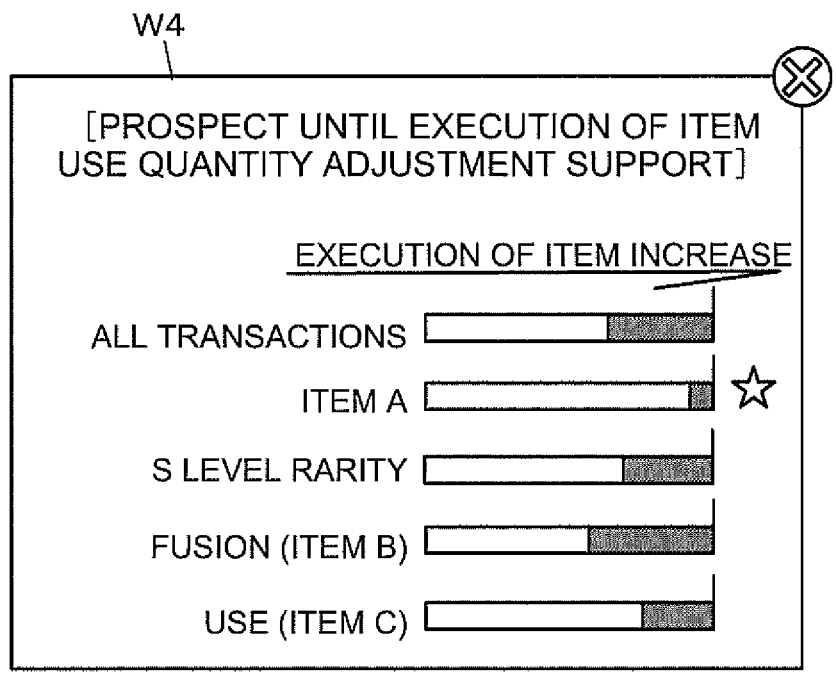
FIG. 10 is a diagram illustrating an example of notification display of information about the item use quantity adjustment support control.

FIG. 10 is a diagram illustrating an example of notification display of information about the item use quantity adjustment support control. In response to a predetermined operation to display the notification in the user terminal 1500, the server system 1100 can cause the user terminal 1500 to display a notification screen W4.

The notification screen W4 shows a prospect of how much more the item use quantity needs to be increased before execution of the use quantity adjustment support of the specific item. For example, it is displayed by a bar graph for each item of the monitoring target that is considered as a basis of the item use quantity adjustment support. Kinds and the number of items of the monitoring targets to be displayed may be set as appropriate. Alternatively, not all the items of the monitoring targets have to be always displayed, but only the one, an indicated value of the bar graph of which reaches a predetermined percentage (for example, about 75%) may be selected and displayed in the notification screen W4.

A latest use quantity and a total available quantity themselves of the specific item for each type or property may be added to the bar graph to also be displayed in the notification screen W4.

Functional Configuration

Figure 11:
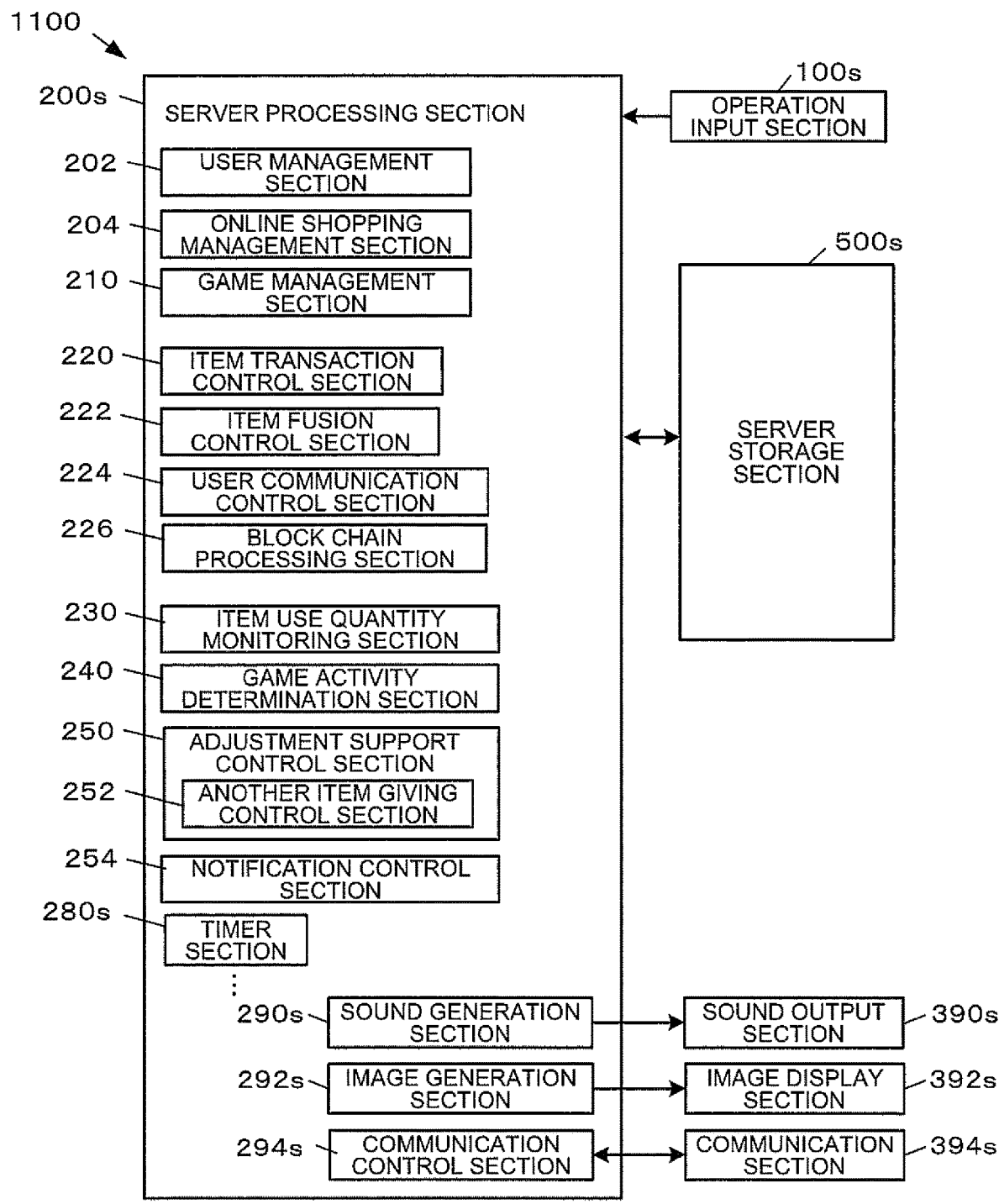
FIG. 11 is a functional block diagram illustrating an example of a functional configuration of a server system.

FIG. 11 is a functional block diagram illustrating an example of a functional configuration of the server system 1100 according to the present embodiment. The server system 1100 according to the present embodiment includes an operation input section 100s, a server processing section 200s, a sound output section 390s, an image display section 392s, a communication section 394s, and a server storage section 500s.

The operation input section 100s is for inputting various operations for server management. The operation input section 100s corresponds to the keyboard 1106 in FIG. 1.

The server processing section 200s is implemented with electronic parts such as a microprocessor (e.g., a CPU and a GPU), an ASIC, and an IC memory. The server processing section 200s controls data exchanged between functional sections including the operation input section 100s and the server storage section 500s. In addition, the server processing section 200s performs various calculation processes based on predetermined programs, data, the operation input signal from the operation input section 100s, data revived from the user terminal 1500, and the like, thereby to entirely control the operation of the server system 1100.

The server processing section 200s according to the present embodiment includes a user management section 202, an online shopping management section 204, a game management section 210, an item transaction control section 220, an item fusion control section 222, a user communication control section 224, a block chain processing section 226, an item use quantity monitoring section 230, a game activity determination section 240, an adjustment support control section 250, a notification control section 254, a timer section 280s, a sound generation section 290s, an image generation section 292s, and a communication control section 294s. Note that functional sections other than these may be included as appropriate.

The user management section 202 performs a process related to a user registration procedure and manages the data of each user associated with a user account. In the present embodiment, the user management section 202 includes functions such as:
1) issuing a unique user account to a registered user;
2) registration information management for registering and managing personal information for each user account;
3) book keeping management for an electronic payment medium consumed for paying for a charged element (online shopping and play cost in the present embodiment);
4) play history management for managing an inquiry request history; and
5) management of game save data.

Note that any other appropriate management function for other data associated with the account can be included.

The online shopping management section 204 is in charge of control related to the online shopping, and can be implemented with a known online shopping technique as appropriate. In the present embodiment, the player can purchase paid gacha tickets, items, and the like through the online shopping. Any other elements may be set as appropriate to be sold through the online shopping.

The game management section 210 performs various processes related to game execution management. The game according to the present embodiment is a client-server online game, and thus the game management section 210 according to the present embodiment communicates with the user terminal 1500 to perform a control for providing data required for the gameplay. The game management section 210 according to the present embodiment performs a progress control of the game in which a character selected form the characters possessed by the player is made to appear.

The item transaction control section 220 implements a control for providing a system for the item transaction between the registered users, and a function for recording and managing transaction ledger data by the block chain system 1200 to ensure validity of the transaction.

According to the present embodiment, the item transaction control section 220 performs matching of the transaction, confirms the validity of the owner of the transacted item by the block chain system 1200, updates information about possessed items of the users after the confirmation, and updates the transaction ledger by the block chain system 1200.

When the transaction between the users is implemented by a direct transaction through a peer-to-peer (P2P) connection between the user terminals 1500, the user terminal 1500 may access the block chain system 1200 for the validity confirmation. When the validity is confirmed and the transaction is concluded, the user terminal 1500 may transmit the transaction information to the server system 1100, and the server system may receive the information and update information about the possessed items of the users.

The item fusion control section 222 performs a control for providing a system for the item fusion, and records and manages histories of the item fusions of all registered users.

The user communication control section 224 performs a control for providing a communication system between the users, and records and manages histories of the communication. In the present embodiment, a text chat is provided, however, a voice chat or a video chat may be provided.

The block chain processing section 226 executes various processes for using the block chain system 1200. In the present embodiment, the block chain processing section 226 executes a process for making the server system 1100 function as the node 1201 (see FIG. 1). In other words, the block chain processing section 226 performs a control for managing an operation input related to the game from each user by a predetermined block chain process. More specifically, the block chain processing section 226 functions as an agent for the block chain system to record and manage the ledger data of the item transaction by the block chain. In a case of a configuration where the server system 1100 is not made to function as the node 1201, the block chain processing section 226 may perform a control for accessing an external block chain system 1200 and requesting such a control.

The item use quantity monitoring section 230 performs a control for monitoring the item use status of each item possessed by the user and the item use quantity in the game.

According to the present embodiment, the item use status can be monitored for each type or property of the specific item in view of the monitoring parameters such as the number of transactions of the specific item (see FIG. 5), the number of item fusions including the specific item (see FIG. 6), the use ratio of the specific item in the gameplay (see FIG. 7), and the number of registered users (see FIG. 8). Furthermore, the item use quantity monitoring section 230 can monitor the item use status of each of a first specific item, a second specific item, and so on, each of which differs in type or property.

The game activity determination section 240 determines the game activity based on at least any one of the player level, play time, and play frequency of each registered user, the number of item types and the number of items possessed by the user, and the statistical information of the users. In the present embodiment, this determination corresponds to the determination of whether the monitoring parameter related to the game activity satisfies the adjustment support condition related to the game activity.

The adjustment support control section 250 performs the item use quantity adjustment support control in which whether to give the item to the user at the predetermined acquiring opportunity, determined as the acquirable opportunity of the item in the game, is controlled based on the giving condition based on the item use quantity.

In the present embodiment, the adjustment support control section 250 can determine which one of the following four methods for giving the item should be adopted:
1) the "drop" left behind by the enemy character 6;
2) the "prize" given depending on a play result such as clearing a stage or map;
3) mixing in the prizes of the "gacha"; and
4) the "random deployment" in the game space or the like in such a manner that a player can find and acquire it. Then, the adjustment support control section 250 determines the giving quantity of the item and makes an execution reservation for the increase. When the predetermined acquiring opportunity arrives, the adjustment support control section 250 puts the execution reservation into practice to perform the item use quantity adjustment support control. The execution reservation is, so to speak, handled as a queue in a calculation process. The adjustment support control is performed as the direct or indirect item giving for the purpose of increase in the use quantity.

The adjustment support control section 250 can vary the "adjustment support condition", which is the giving condition, for each specific item of a different type or property.

Moreover, the adjustment support control section 250 can determine whether to designate the specific item as the item to be given at the acquiring opportunity. Specifically, the adjustment support control section 250 can determine which one of the items should be given, the specific item of the monitoring target, or a new type item that has not been available in the game yet. In the former case, the item use quantity adjustment support can be performed for the purpose of any one of: 1) increasing the use quantity of the item which is the transaction target when the transaction is made; 2) increasing the use quantity of the item which is the fusion target when the fusion is performed; and 3) increasing the use quantity of the used item when the item is used in the gameplay.

Furthermore, the adjustment support control section 250 can change the giving quantity when giving the item, based on a predetermined condition. According to the present embodiment, the giving quantity is determined based on the function f (see FIG. 9) for calculating the giving quantity.

The adjustment support control section 250 includes an another item giving control section 252. That is to say, it is possible to perform the use quantity adjustment support of an item of a giving target that is associated with the item of the monitoring target, based on the item use quantity of the monitoring target monitored by the item use quantity monitoring section 230.

The notification control section 254 performs a control for notifying the user of the information related to the item use quantity adjustment support or the item use quantity. In the present embodiment, the control related to the display of the notification screen W4 (see FIG. 10) corresponds to this control.

The timer section 280s uses a system clock to obtain the current date and time, a limited time period, and the like.

The sound generation section 290s is implemented with an integrated circuit (IC) or by executing software that generates sound data and performs decoding, and generates or decodes sound data on operation sound and background music (BGM) related to system management for the server system 1100 and the gameplay. The resultant sound signal related to the system management is output to the sound output section 390s.

The sound output section 390s receives the sound signal to emit the corresponding sound. The sound output section 390s corresponds to a speaker (not illustrated) of the main body device 1101 or the touch panel 1108 in the example illustrated in FIG. 1.

The image generation section 292s can generate an image related to the system management for the server system 1100, a game image (or data for displaying the game image on the user terminal 1500), and the like. The image related to the system management can be output to the image display section 392s.

The image display section 392s displays various images for system management based on the image signals input from the image generation section 292s. The image display section 392s can be implemented with an image display device, such as a flat panel display, a cathode ray tube (CRT), a projector, or a head-mounted display. The image display section 392s corresponds to the touch panel 1108 in the example illustrated in FIG. 1.

The communication control section 294s performs a data process related to the data communication, and exchanges data with an external device through the communication section 394s.

The communication section 394s connects to the communication line 9 to implement communication. The communication section 394s is implemented with a transceiver, a modem, a terminal adapter (TA), a jack for a communication cable, a control circuit, and the like. The communication section 394s corresponds to the communication device 1153 in the example illustrated in FIG. 1.

The server storage section 500s stores a program and various types of data for implementing various functions of the server processing section 200s for entirely controlling the server system 1100. The server storage section 500s is used as a work area for the server processing section 200s, and temporarily stores the results of calculations performed by the server processing section 200s based on various programs. The functions of the server storage section 500s are implemented with an IC memory (e.g., RAM and ROM), a magnetic disk (e.g., hard disk), an optical disk (e.g., CD-ROM and DVD), an online storage, or the like. The server storage section 500s corresponds to a storage medium, such as the IC memory 1152 and hard disk mounted in the main body device 1101, and the storage 1140 in the example illustrated in FIG. 1.

Figure 12:
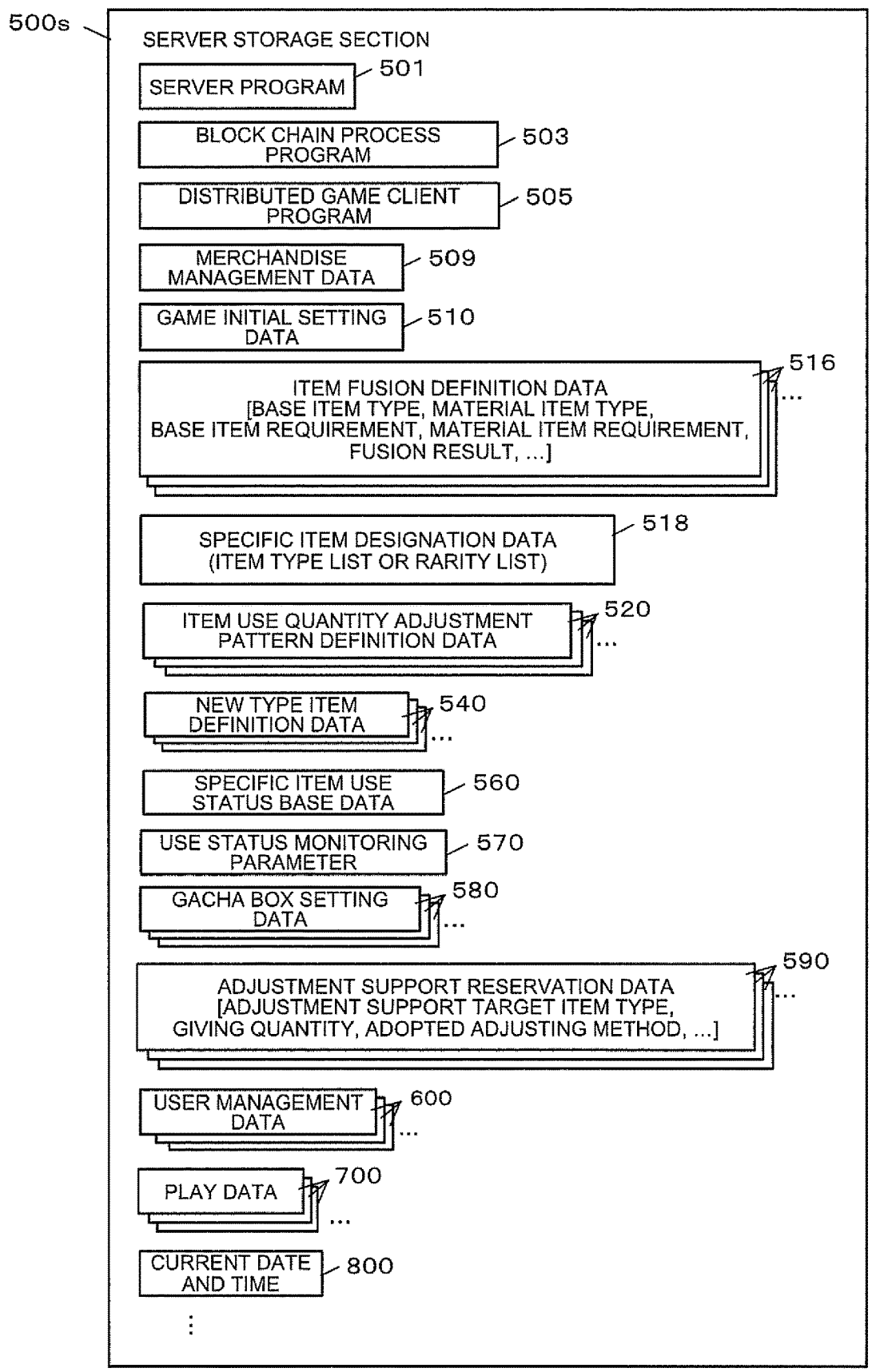
FIG. 12 is a diagram illustrating an example of programs and data stored in a server storage section.

FIG. 12 is a diagram illustrating an example of programs and data stored in the server storage section 500s according to the present embodiment. The server storage section 500s according to the present embodiment stores a server program 501, a block chain process program 503, a distributed game client program 505, merchandise management data 509, game initial setting data 510, item fusion definition data 516, specific item designation data 518, item use quantity adjustment pattern definition data 520, and new type item definition data 540.

The server storage section 500s stores data, sequentially generated and managed, including specific item use status base data 560, use status monitoring parameter 570, gacha box setting data 580, adjustment support reservation data 590, user management data 600, play data 700, and current date and time 800. Furthermore, the server storage section 500s can store information on a timer, a counter, various flags, and the like as appropriate.

The server program 501 is a program read and executed by the server processing section 200s to implement the functions of the user management section 202, the online shopping management section 204, and the game management section 210 (see FIG. 11).

The block chain process program 503 is a program for causing the server system 1100 to implement the functions as the node 1201 of the block chain system 1200 and the block chain processing section 226 (see FIG. 11).

The distributed game client program 505 is an original of a game client program provided for the user terminal 1500.

The merchandise management data 509 includes data for defining and managing selling products of online shopping. For example, purchasable items, stock quantities, and charge prices (equivalent to debit amounts from payment media in the present embodiment) are stored in association with one another. In the present embodiment, the selling products include not only the possessed objects such as the character that can be used as the player character 4 and the item 7 equipped to the player character 4 (see FIG. 3), but also an execution right of the paid gacha and the like.

Figure 13:
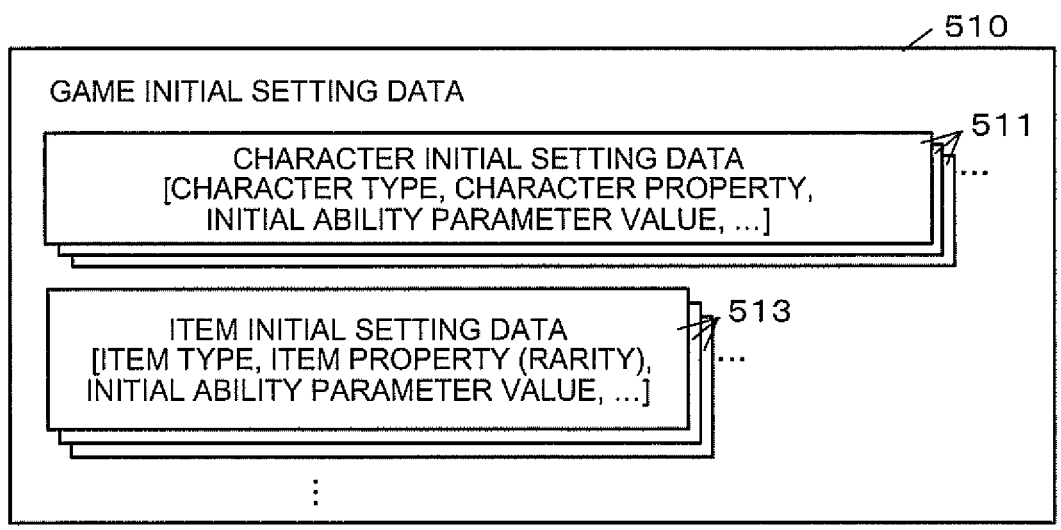
FIG. 13 is a diagram illustrating an example of a data structure of game initial setting data.

The game initial setting data 510 includes various kinds of initial setting data for implementing the game according to the present embodiment. For example, as shown in FIG. 13, the game initial setting data 510 includes character initial setting data 511 prepared for each type of the character that can be used as the player character 4, and item initial setting data 513 prepared for each type of the item 7.

One character initial setting data 511 includes a unique type of the character, a property of the character (at least rarity is included in the present embodiment), and a parameter value of initial ability. Note that information other than these may be included as appropriate.

One item initial setting data 513 includes a unique type of the item, a property of the item (at least rarity is included in the present embodiment), and a parameter value of initial ability. Note that information other than these may be included as appropriate.

Referring back to FIG. 12, the item fusion definition data 516 is prepared for each pattern of the item fusion and includes various data defining details of the fusion of each pattern. One item fusion definition data 516 includes, for example, a base item type representing an item for a base, a material item type representing an item for material, a base item requirement that the base item should satisfy (for example, a certain level or higher), a material item requirement that the material item should satisfy (for example, a number of items to be prepared), and a fusion result defining a result of the fusion. Note that information other than these, such as an initial value of a fusion success rate to be applied, may be included as appropriate.

The specific item designation data 518 includes data that designate an item that is the monitoring target of the use status and becomes an adjustment support target of the item use quantity depending on the use status. For example, the specific item designation data 518 is implemented as a list of target item types or a list of target item properties.

The item use quantity adjustment pattern definition data 520 is prepared for each pattern to perform the item use quantity adjustment support and includes various data for defining each pattern.

Figure 14:
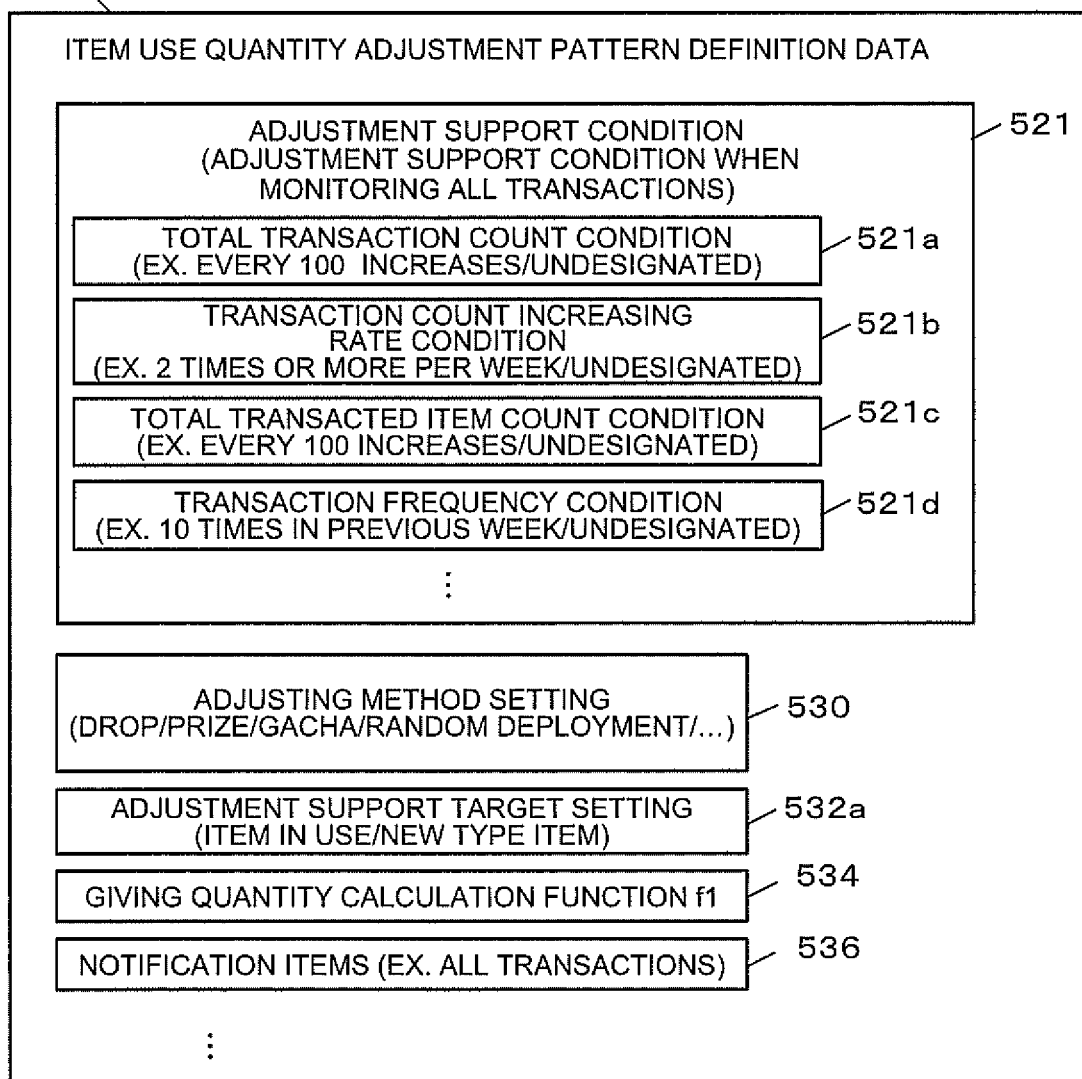
FIG. 14 is a diagram illustrating an example of a data structure of item use quantity adjustment pattern definition data (part 1).

For example, FIG. 14 is a diagram illustrating an example of a data structure of the item use quantity adjustment pattern definition data 520 when "all transactions" are focused as the monitoring targets for monitoring the item use status. When "all transactions" are adopted as the monitoring targets, the item use quantity adjustment pattern definition data 520 includes an adjustment support condition 521, an adjusting method setting 530, an adjustment support target setting 532a, a giving quantity calculation function 534, and notification items 536. Note that information other than these may be included as appropriate.

The adjustment support condition 521 is described as an AND condition or an OR condition including one or more sub-conditions related to the monitoring parameter for the item transaction. In the present embodiment, the sub-conditions include:
1) a total transaction count condition 521a that is a condition related to a total number of transactions;
2) a transaction count increasing rate condition 521b that is a condition related to an increasing rate of a number of transactions in a predetermined calculation period (for example, one week, one month, or the like);
3) a total transacted item count condition 521c that is a condition related to a total number of transacted items; and
4) a transaction frequency condition 521d that is a condition related to a transaction frequency in a predetermined calculation period. A configuration omitting one or more of these sub-conditions as appropriate may be employed. On the contrary, sub-conditions other than these related to the transactions may be included as appropriate.

The adjusting method setting 530 includes data that specify an adjusting method for adjusting the item use quantity. In the present embodiment, one or more of the "drop", "prize", "gacha", and "random deployment" are set.

When a plurality of adjusting methods are set, the adjusting method to be actually adopted is determined every time by random lottery including the plurality of adjusting methods as options.

The adjustment support target setting 532a specifies a condition for determining the type of the specific item that is set as the adjustment support target. When "all transactions" are adopted as the monitoring targets, the adjustment support target setting 532a specifies which specific item is set as the adjustment support target: any one or more of the specific items in use; or a specific item of a new type (new type item: another item) that has not been available (has never been used) when the increase is determined. When both of the specific items are set, the adjustment support target to be actually adopted is determined every time by random lottery including both specific items as options.

The giving quantity calculation function 534 defines the function (see FIG. 9) that determines the giving quantity of the item that is set as the adjustment support target related to the adjustment support. The giving quantity calculation function 534 may be replaced with the table data.

The notification items 536 are names of items used when the information related to the adjustment pattern is displayed on the notification screen W4 (see FIG. 10).

Figure 15:
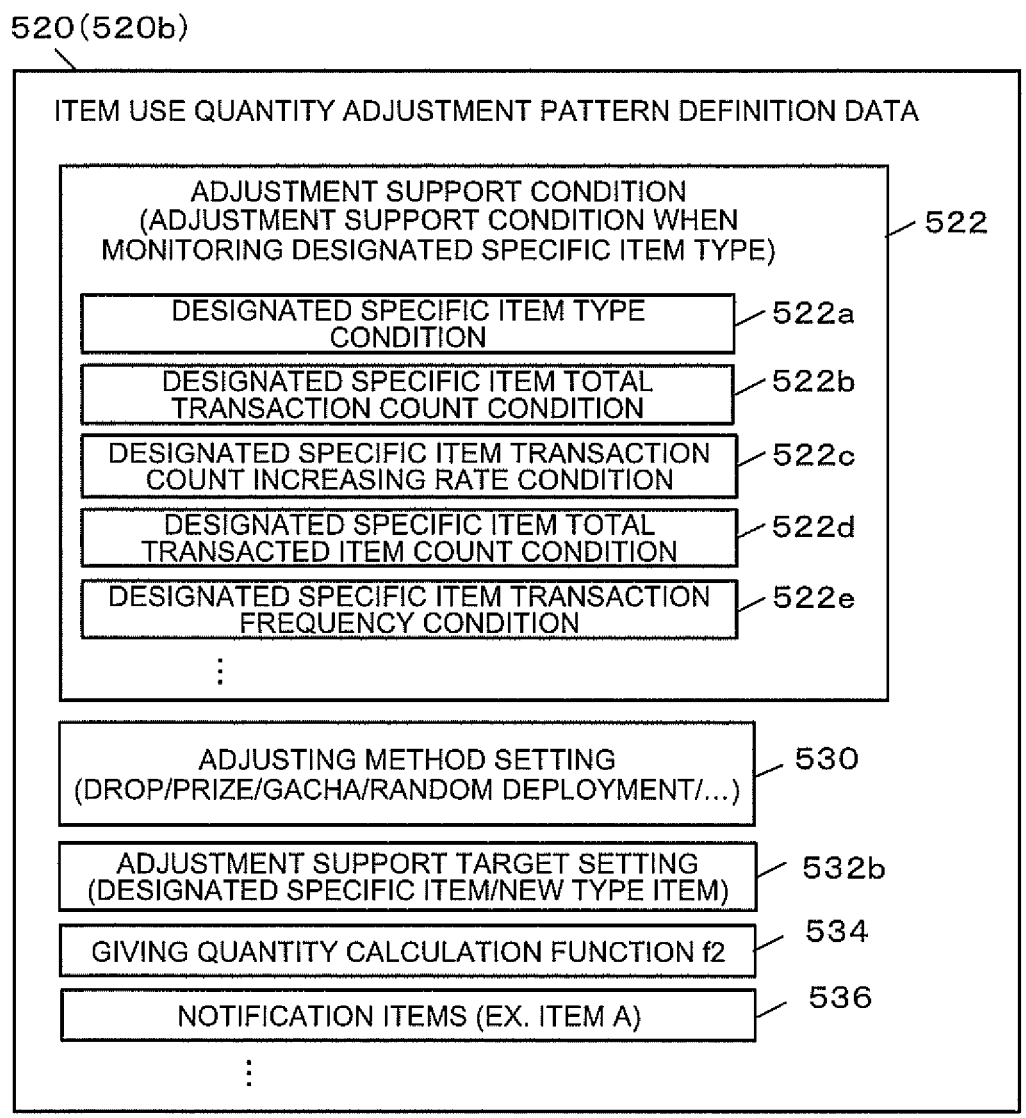
FIG. 15 is a diagram illustrating an example of the data structure of the item use quantity adjustment pattern definition data (part 2).

For example, FIG. 15 is a diagram illustrating an example of a data structure of the item use quantity adjustment pattern definition data 520 (520b) when a "specific item type" is focused as the monitoring target for monitoring the item use status. When the "specific item type" is adopted as the monitoring target, the item use quantity adjustment pattern definition data 520 includes an adjustment support condition 522, the adjusting method setting 530, an adjustment support target setting 532b, the giving quantity calculation function 534, and the notification items 536. Note that information other than these may be included as appropriate.

The adjustment support condition 522 is described as an AND condition or an OR condition including one or more sub-conditions related to the monitoring parameter for the transaction limited to the specific item of the designated type. In the present embodiment, the sub-conditions include:
1) a designated specific item type condition 522a that designates the type (for example, the "sword of the god of thunder") of the specific item that is subject to the determination of whether the condition is satisfied;
2) a designated specific item total transaction count condition 522b that is a condition related to a total number of transactions counted by limiting to the specific item of the designated type;
3) a designated specific item transaction count increasing rate condition 522c that is a condition related to the increasing rate of the number of transactions counted by limiting to the specific item of the designated type;
4) a designated specific item total transacted item count condition 522d that is a condition related to a total number of transacted items counted by limiting to the specific item of the designated type; and
5) a designated specific item transaction frequency condition 522e that is a condition related to the transaction frequency counted by limiting to the specific item of the designated type. The adjustment support condition 522 may be set to include a different content for each type of the specific item designated by the designated specific item type condition 522a. A configuration of the adjustment support condition 522 omitting one or more of these sub-conditions as appropriate may be employed. On the contrary, sub-conditions other than these related to the transactions may be included as appropriate.

When the "specific item type" is adopted as the monitoring target, the adjustment support target setting 532b may be set to any one or both of the specific item of the type of the monitoring target (designated specific item), that is, the transacted item, and a new type item that has not been available yet.

Figure 16:
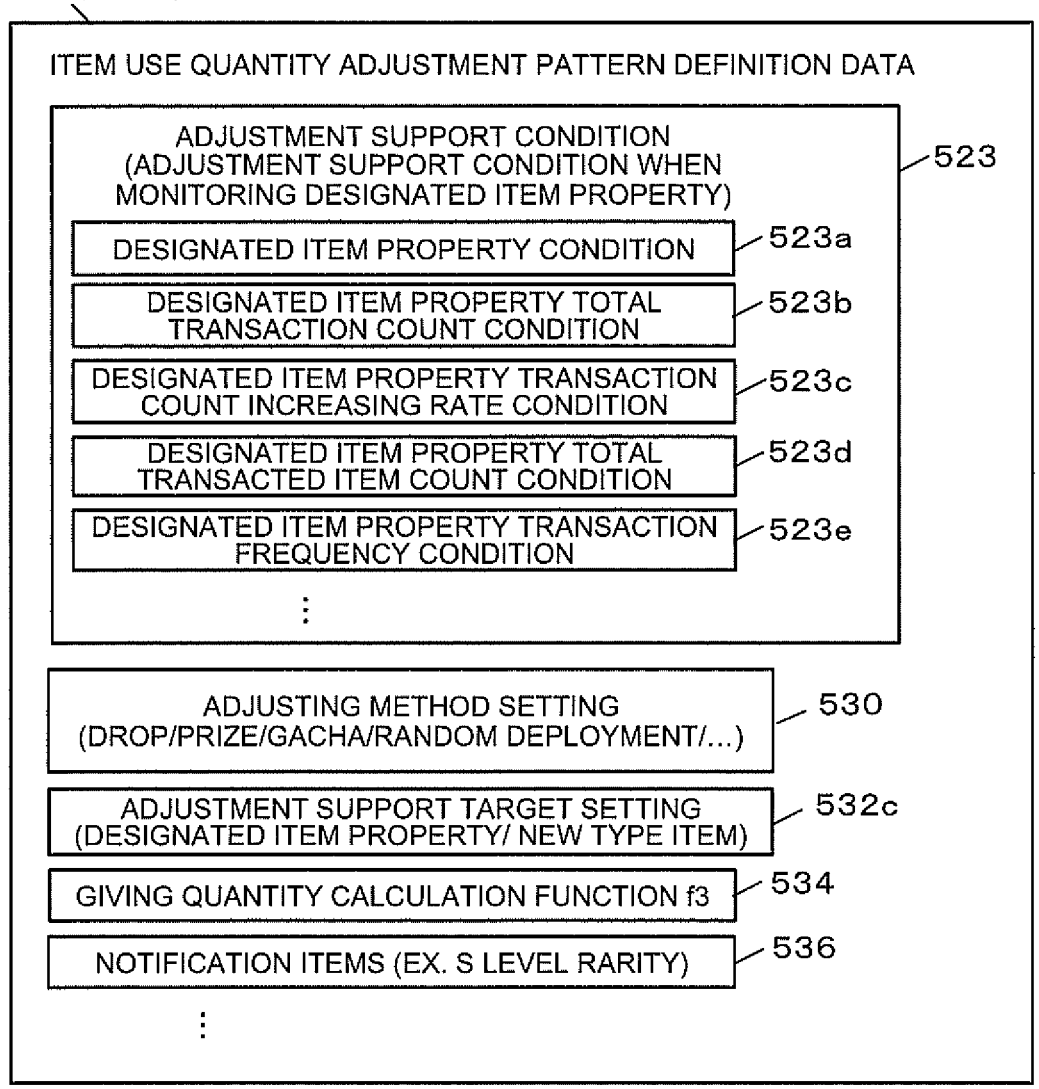
FIG. 16 is a diagram illustrating an example of the data structure of the item use quantity adjustment pattern definition data (part 3).

For example, FIG. 16 is a diagram illustrating an example of a data structure of the item use quantity adjustment pattern definition data 520 (520c) when a "specific item property" is focused as the monitoring target for monitoring the item use status. When the "specific item property" is adopted as the monitoring target, the item use quantity adjustment pattern definition data 520 includes an adjustment support condition 523, the adjusting method setting 530, an adjustment support target setting 532c, the giving quantity calculation function 534, and the notification items 536. Note that information other than these may be included as appropriate.

The adjustment support condition 523 is described as an AND condition or an OR condition including one or more sub-conditions related to the monitoring parameter for the transaction limited to the specific item of the designated property. In the present embodiment, the sub-conditions include:
1) a designated item property condition 523a that designates the property (for example, "S level rarity") of the specific item that is subject to the determination of whether the condition is satisfied;
2) a designated item property total transaction count condition 523b that is a condition related to a total number of transactions counted by limiting to the specific item of the designated property;
3) a designated item property transaction count increasing rate condition 523c that is a condition related to the increasing rate of the number of transactions counted by limiting to the specific item of the designated property;
4) a designated item property total transacted item count condition 523d that is a condition related to a total number of transacted items counted by limiting to the specific item of the designated property; and
5) a designated item property transaction frequency condition 523e that is a condition related to the transaction frequency counted by limiting to the specific item of the designated property. The adjustment support condition 523 may be set to include different content for each item property of the monitoring target. A configuration of the adjustment support condition 523 omitting one or more of these sub-conditions as appropriate may be employed. On the contrary, sub-conditions other than these related to the transactions may be included as appropriate.

When the "specific item property" is adopted as the monitoring target, the adjustment support target setting 532c can be set to any one or both of the specific item of the property of the monitoring target, and a new type item.

Figure 17:
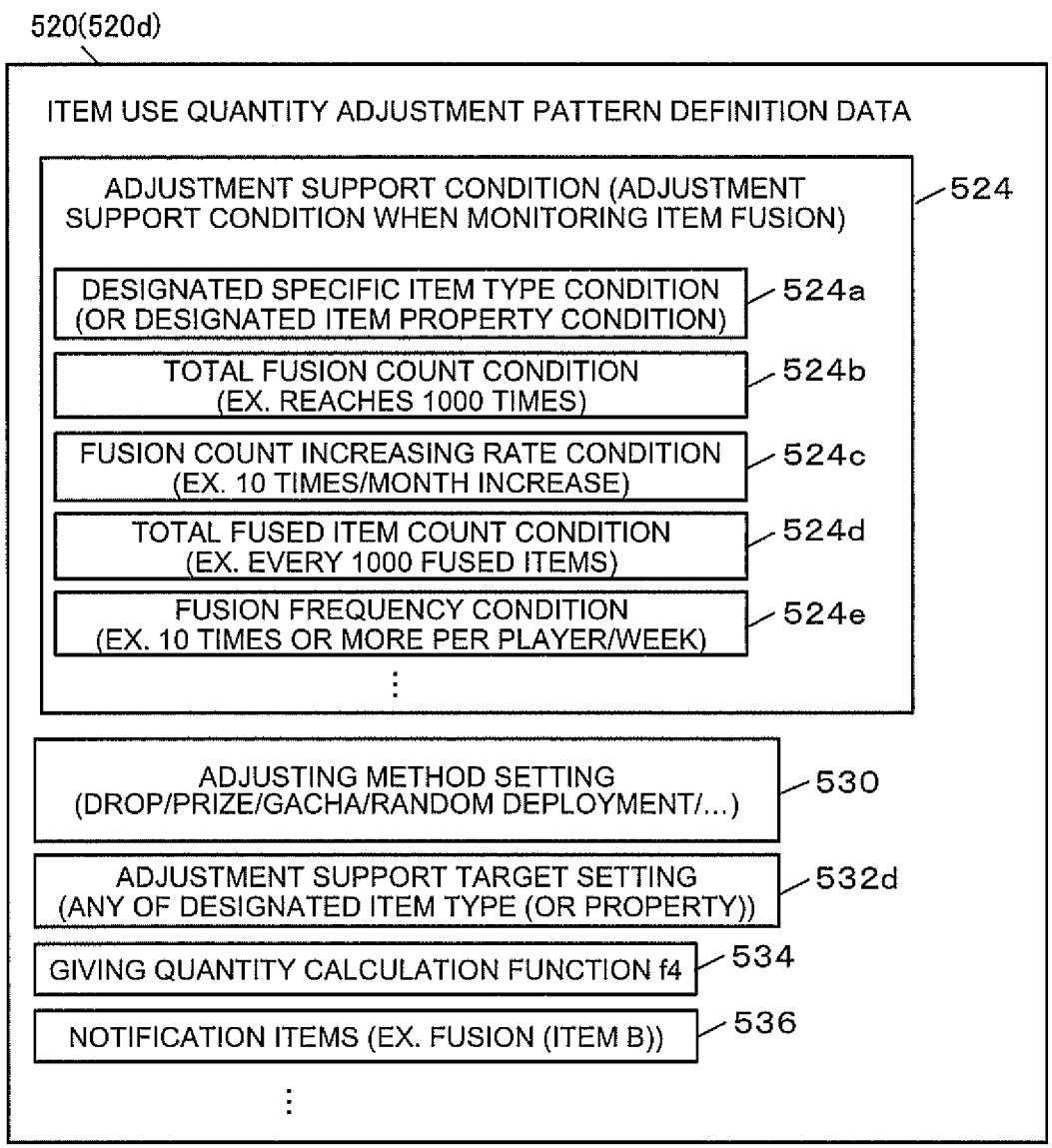
FIG. 17 is a diagram illustrating an example of the data structure of the item use quantity adjustment pattern definition data (part 4).

For example, FIG. 17 is a diagram illustrating an example of a data structure of the item use quantity adjustment pattern definition data 520 (520d) when the "item fusion" is adopted as the monitoring target for monitoring the item use status. When the "item fusion" is adopted as the monitoring target, the item use quantity adjustment pattern definition data 520 (520d) includes an adjustment support condition 524, the adjusting method setting 530, an adjustment support target setting 532d, the giving quantity calculation function 534, and the notification items 536. Note that information other than these may be included as appropriate.

The adjustment support condition 524 is described as an AND condition or an OR condition including one or more sub-conditions related to the monitoring parameter for the item fusion. In the present embodiment, the sub-conditions include:

1) a designated specific item type condition 524a (or a designated item property condition) that is a condition related to the type (or property) of the specific item of the monitoring target;
2) a total fusion count condition 524b that is a condition related to a total number of item fusions;
3) a fusion count increasing rate condition 524c that is a condition related to the increasing rate during a predetermined calculation period of the total number of item fusions;
4) a total fused item count condition 524d that is a condition related to a total number of fused items; and
5) a fusion frequency condition 524e that is a condition related to a frequency of the item fusion in the predetermined calculation period. The adjustment support condition 524 may be set to include different content for each type or property of the item of the monitoring target. A configuration of the adjustment support condition 524 omitting one or more of these sub-conditions as appropriate may be employed. On the contrary, sub-conditions other than these related to the fusion may be included as appropriate. It is possible to employ a configuration in which the designated specific item type condition 524a is not adopted or is set to "undesignated" to perform the item use quantity adjustment support control based on approximately all the results of the item fusions.

When the "item fusion" is adopted as the monitoring target, the adjustment support target setting 532d is set to the type of the specific item of the monitoring target. That is, it is set to any one or both of the items that are subjected to the fusion. Not only the items such as the base item and the material item, but also a resultant fused item may be specified. When the property of the specific item is adopted as the monitoring target, the adjustment support target setting 532d is set to any one or more of the specific items of the property of the monitoring target. Alternatively, the property of the specific item of the monitoring target may be set.

Figure 18:
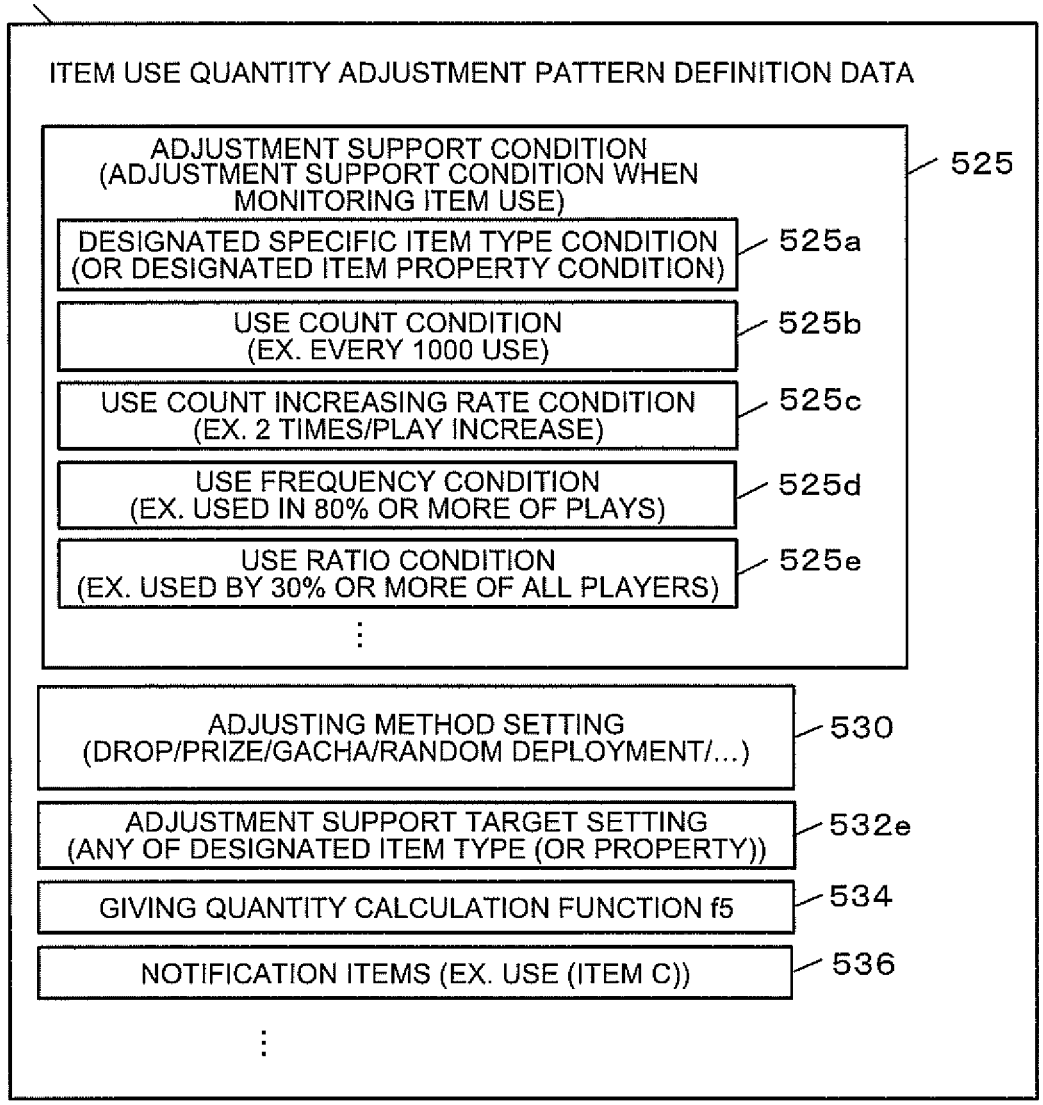
FIG. 18 is a diagram illustrating an example of the data structure of the item use quantity adjustment pattern definition data (part 5).

For example, FIG. 18 is a diagram illustrating an example of a data structure of the item use quantity adjustment pattern definition data 520 (520e) when the "item use in the gameplay" is focused as the monitoring target for monitoring the item use status. When the "item use" is adopted as the monitoring target, the item use quantity adjustment pattern definition data 520 (520e) includes an adjustment support condition 525, the adjusting method setting 530, an adjustment support target setting 532e, the giving quantity calculation function 534, and the notification items 536. Note that information other than these may be included as appropriate.

The adjustment support condition 525 is described as an AND condition or an OR condition including one or more sub-conditions related to the monitoring parameter for the item use. In the present embodiment, the sub-conditions include:

1) a designated specific item type condition 525a (or a designated item property condition) that is a condition related to the type (or property) of the specific item of the monitoring target;
2) a use count condition 525b that is a condition related to a total number of item use;
3) a use count increasing rate condition 525c that is a condition related to the increasing rate during a predetermined calculation period of the total number of item use;
4) a use frequency condition 525d that is a condition related to a use frequency; and
5) a use ratio condition 525e that is a condition related to a ratio of the users who used or are using the specific item of the monitoring target to all the registered users. The adjustment support condition 525 may be set to include different content for each type or property of the item of the monitoring target. A configuration of the adjustment support condition 525 omitting one or more of these sub-conditions as appropriate may be employed. On the contrary, sub-conditions other than these related to the use may be included as appropriate. It is possible to employ a configuration in which the designated specific item type condition 525a is not adopted or is set to "undesignated" to increase the item use quantity based on approximately all the results of the item use in the gameplay.

When the "item use in the gameplay (item use)" is adopted as the monitoring target, the adjustment support target setting 532e is set to the type of the specific item of the monitoring target. That is, it is the used item. When the property of the specific item is adopted as the monitoring target, the adjustment support target setting 532e is set to any one or more of the specific items of the property of the monitoring target.

Figure 19:
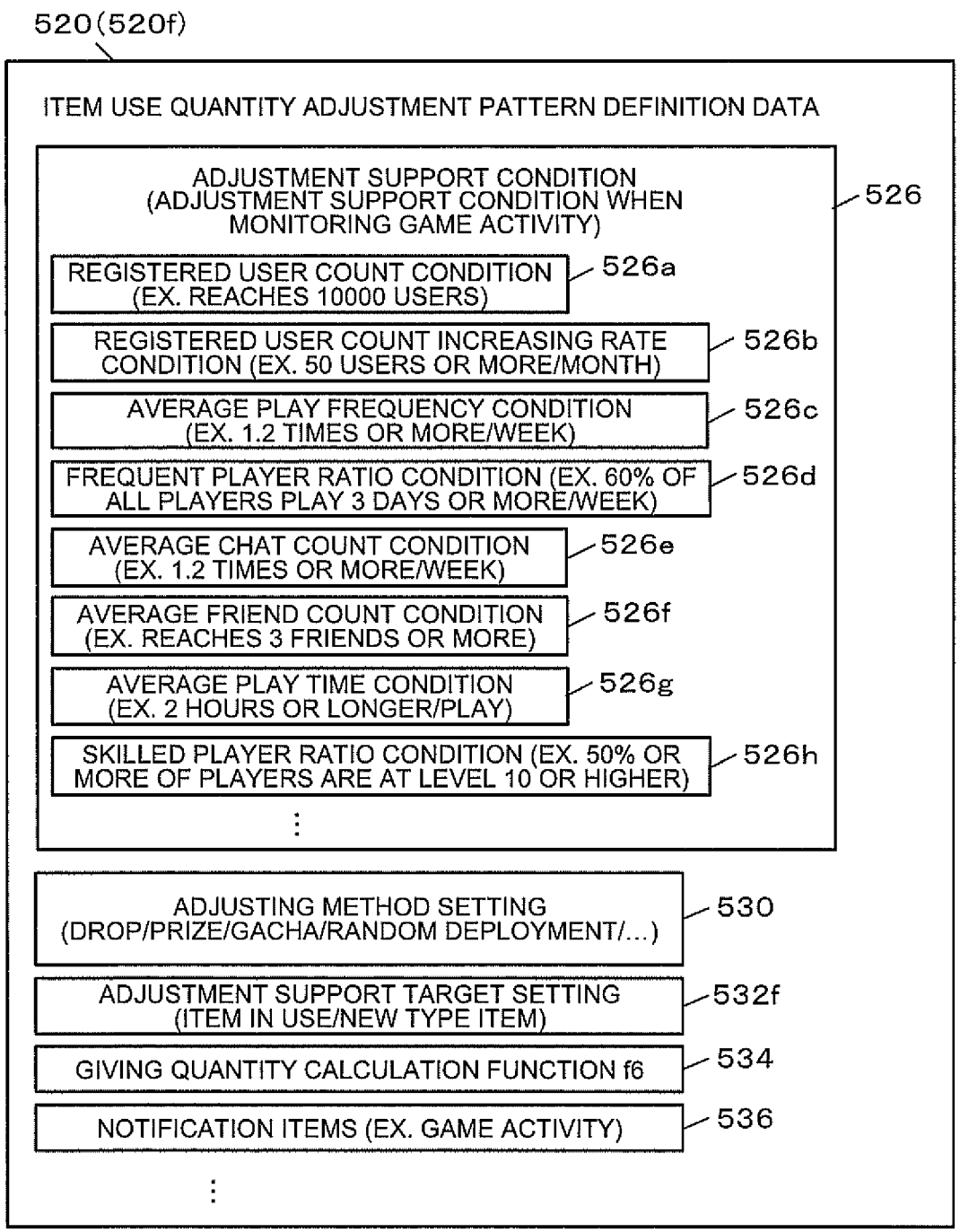
FIG. 19 is a diagram illustrating an example of the data structure of the item use quantity adjustment pattern definition data (part 6).

For example, FIG. 19 is a diagram illustrating an example of a data structure of the item use quantity adjustment pattern definition data 520 (520f) when the "game activity" is focused as the monitoring target for monitoring the item use status. When the "game activity" is adopted as the monitoring targets, the item use quantity adjustment pattern definition data 520 (520f) includes an adjustment support condition 526, the adjusting method setting 530, an adjustment support target setting 532f, the giving quantity calculation function 534, and the notification items 536. Note that information other than these may be included as appropriate.

The adjustment support condition 526 is described as an AND condition or an OR condition including one or more sub-conditions related to the monitoring parameter for the game activity. In the present embodiment, the sub-conditions include:

1) a registered user count condition 526a that is a condition related to the number of registered users;
2) a registered user count increasing rate condition 526b that is a condition related to the increasing rate of the number of registered users;
3) an average play frequency condition 526c that is a condition related to an average play frequency of the registered users;
4) a frequent player ratio condition 526d that is a condition related to a ratio of players considered to be frequent plyers to the registered users;
5) an average chat count condition 526e that is a condition related to the chat between the registered users;
6) an average friend count condition 526f that is a condition related to a number of registrations of the registered users;
7) an average play time condition 526g that is a condition related to an average play time of the registered users; and
8) a skilled player ratio condition 526h that is a condition related to a ratio of users who reach a player level considered to be skilled players to the registered users.

A configuration omitting one or more of these sub-conditions as appropriate may be employed. On the contrary, sub-conditions other than these related to the game activity may be included as appropriate. For example, it is possible to monitor a number of item types or a number of items possessed by the registered users, the statistical information of the users, and the like, and include them in the sub-conditions. The statistical information of the users includes, for example, the total number of users, the male-to-female ratio, an average amount of charge, a ratio of high-paying users, the age composition, and so on.

When the "game activity" is adopted as the monitoring target, the adjustment support target setting 532f specifies which specific item is set as the adjustment support target: any one or more of the specific items in use; or a specific item of a new type (new type item) that has never been used when the increase is determined. When both of the specific items are set, an increasing method to be actually adopted is determined every time by random lottery including both specific items as options.

In a configuration where a value of the game activity is separately determined by a predetermined function including a value of the monitoring parameter related to the game activity as variable, the adjustment support condition 526 may be set as a threshold or a range of the value of the game activity.

Referring back to FIG. 12, the new type item definition data 540 includes definition data related to the specific item to be newly added to the game due to the increase of the item use quantity. Specifically, when the adjustment support target of the item use quantity is set to the new specific item that has not been available at that time instead of the available specific item, the new type item definition data 540 specifies what kind of new type item should be added.

Figure 20:
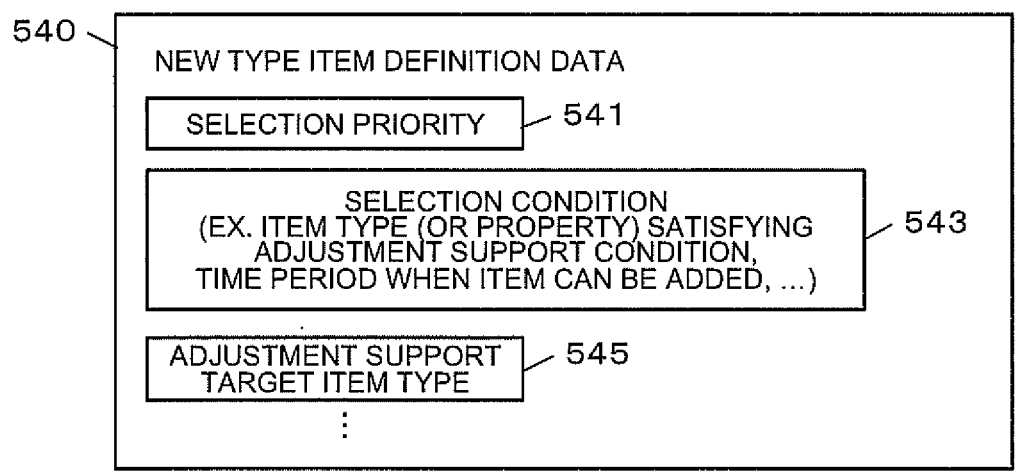
FIG. 20 is a diagram illustrating an example of a data structure of new type item definition data.

One new type item definition data 540 includes, as illustrated in FIG. 20, a selection priority 541, a selection condition 543, and an adjustment support target item type 545. Note that information other than these may be included as appropriate.

The selection priority 541 represents a priority of each of the new type item definition data 540 to be referred to.

The selection condition 543 defines a condition for newly adding the item on the new type item definition data 540 thus referred to.

For example, the type of the specific item that has satisfied the adjustment support condition can be set. In such a case, another item associated with the specific item of the monitoring target may be set as a target of a new addition, or a target to be newly given to the player. Furthermore, the new type item definition data 540 may include a period of time in which the new type item can be added. The new type item definition data 540 of a Christmas season limited item may include the Christmas season in the selection condition 543.

Note that other parameters may be included in the condition as appropriate. For example, when a new type item is set as a specific item that appears only after the number of registered users in the game as a whole reaches 10000, the selection condition 543 may be set as "a number of registered users reaches 10000."

The new type item definition data 540, the selection condition 543 of which is satisfied, is searched in order of the selection priority 541, and the specific item defined in the new type item definition data 540 found first by the search is newly added to the game by the increasing method determined at an increase determination of the item use quantity.

Referring back to FIG. 12, the specific item use status base data 560 includes various data which become bases for monitoring the use status of the specific item.

Figure 21:
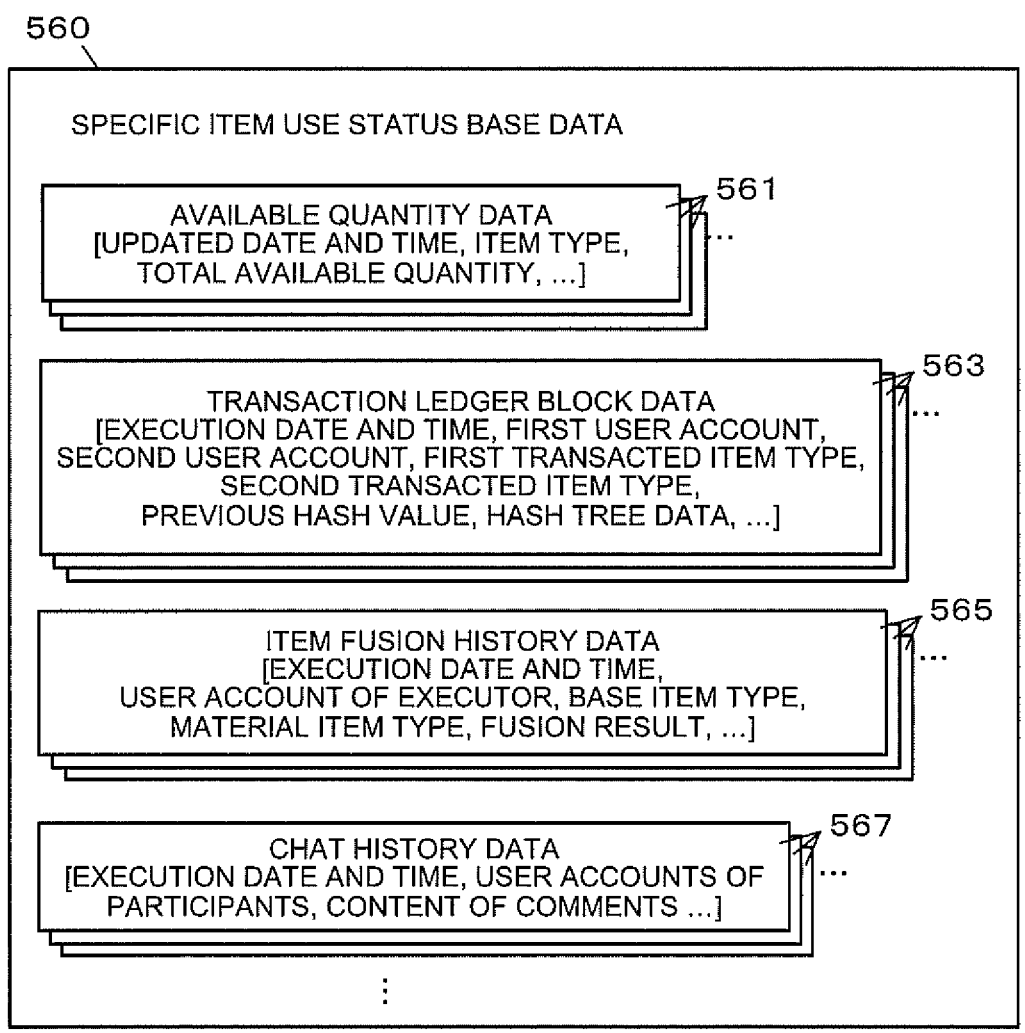
FIG. 21 is a diagram illustrating an example of a data structure of specific item use status base data.

The specific item use status base data 560, as illustrated in FIG. 21, includes available quantity data 561, a transaction ledger block data 563, item fusion history data 565, and chat history data 567. Note that data other than these can be included as appropriate.

The available quantity data 561 is prepared for each type and/or property of the specific item of the monitoring target, and stores a total available quantity of the specific item in the game.

One available quantity data 561 includes, for example, update date and time, a type (or property) of the specific item, and the total available quantity. When the specific item is added to (becomes available in) the game world by the method such as the "drop", "prize", "gacha", and "random deployment", corresponding available quantity data 561 is updated. An initial value of each of the available quantity data 561 is set by a game administrator.

With regard to the "gacha", the specific item is set to be dispensed as a prize. Accordingly, even if the item has not been dispensed yet, it is included in the available quantity. The available quantity data 561 may include other information such as a maximum quantity, as appropriate.

The transaction ledger block data 563 is a transaction ledger of the transactions of the specific item, and is recorded and updated by a block chain procedure. For example, the transaction ledger block data 563 includes, for example, transaction date and time, a first user account and a second user account representing the registered users who made the transaction, a first transacted item type and a second transacted item type as information representing a transaction content, a previous hash value, hash tree data, a public encryption key, an electronic signature, and the like. It is possible to select as appropriate which of these data is actually included, depending on specifications of an adopted block chain system.

The item fusion history data 565 is created at each execution of item fusion, and includes various data related to a content of the item fusion. For example, the item fusion history data 565 includes execution date and time, a user account of an executer, a base item type, a material item type, and a fusion result. Note that data other than these can be included as appropriate depending on the game content and rules of the item fusion.

The chat history data 567 corresponds to a use history of user communication in the present embodiment, and is created every time when the chat is made. The present embodiment adopts the text chat, and thus one chat history data 567 includes date and time of the chat, user accounts of participants, and a content of the chat. When the voice chat or the video chat is adopted, the number of comments can be included instead of the content.

Similarly to the transaction ledger block data 563, the item fusion history data 565 and the chat history data 567 may also be managed to be recorded and updated in the block chain system 1200 as information of each user about the operation input related to the game.

Figure 22:
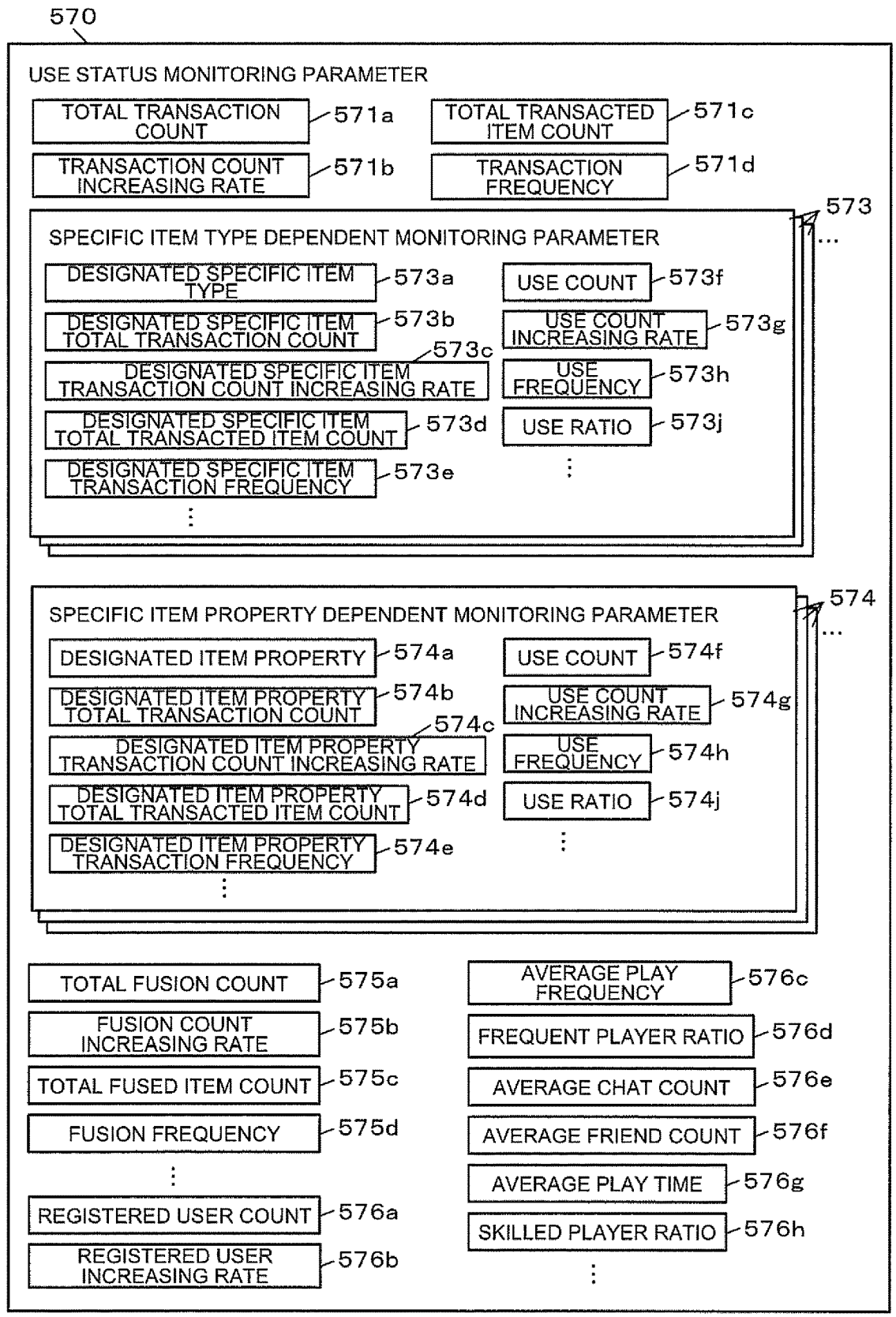
FIG. 22 is a diagram illustrating an example of a data structure of use status monitoring parameter.

Referring back to FIG. 12, the use status monitoring parameter 570 includes various monitoring parameters of the use status of the specific item, and is updated based on the available quantity data 561 and save data for each of the registered users described later. According to the present embodiment, as illustrated in FIG. 22 for example, the use status monitoring parameter 570 includes monitoring parameters to compare with the adjustment support conditions 521 to 526 of the item use quantity adjustment pattern definition data 520 (see FIGS. 14 to 19) for determination.

Specifically, the use status monitoring parameter 570 includes a total transaction count 571a, a transaction count increasing rate 571b, a total transacted item count 571c, and a transaction frequency 571d, as monitoring parameters related to the transactions as a whole. Note that information other than these may be included as appropriate, corresponding to a content of definitions of the adjustment support condition 521 (see FIG. 14). It can be said that the total transaction count 571*a* and the total transacted item count 571*c* among those are parameters representing item use quantity in the present embodiment.

Furthermore, the use status monitoring parameter 570 includes a specific item type dependent monitoring parameter 573 prepared for each type of the specific item. One specific item type dependent monitoring parameter 573 includes a designated specific item type 573*a*, a designated specific item total transaction count 573*b*, a designated specific item transaction count increasing rate 573*c*, a designated specific item total transacted item count 573*d*, a designated specific item transaction frequency 573*e*, a use count 573*f*, a use count increasing rate 573*g*, a use frequency 573*h*, and a use ratio 573*j*. Note that information other than these may be included as appropriate, corresponding to the definitions of the adjustment support condition 522 (see FIG. 15) and the adjustment support condition 525 (see FIG. 18). It can be said that the designated specific item total transaction count 573*b*, designated specific item total transacted item count 573*d*, and the use count 573*f* among those are parameters representing item use quantity in the present embodiment.

Furthermore, the use status monitoring parameter 570 includes specific item property dependent monitoring parameter 574 prepared for each property of the specific item. One specific item property dependent monitoring parameter 574 includes a designated item property 574*a*, a designated item property total transaction count 574*b*, a designated item property transaction count increasing rate 574*c*, a designated item property total transacted item count 574*d*, a designated item property transaction frequency 574*e*, a use count 574*f*, a use count increasing rate 574*g*, a use frequency 574*h*, and a use ratio 574*j*. Note that information other than these may be included as appropriate, corresponding to the definitions of the adjustment support condition 523 (see FIG. 16) and the adjustment support condition 525 (see FIG. 18).

It can be said that the designated item property total transaction count 574*b*, the designated item property total transacted item count 574*d*, and the use count 574*f* among those are parameters representing the item use quantity in the present embodiment.

Furthermore, the use status monitoring parameter 570 includes monitoring parameters related to the item fusion such as a total fusion count 575*a*, a fusion count increasing rate 575*b*, a total fused item count 575*c*, and a fusion frequency 575*d*. Note that information other than these may be included as appropriate, corresponding to the content of the definitions of the adjustment support condition 524 (see FIG. 17). It can be said that the total fusion count 575*a* and the total fused item count 575*c* among those are parameters representing item use quantity in the present embodiment.

Furthermore, the use status monitoring parameter 570 includes monitoring parameters related to the game activity such as a registered user count 576*a*, a registered user increasing rate 576*b*, an average play frequency 576*c*, a frequent player ratio 576*d*, an average chat count 576*e*, average play time 576*g*, and a skilled player ratio 576*h*. Note that information other than these may be included as appropriate, corresponding to the content of the definitions of the adjustment support condition 526 (see FIG. 19).

Figure 23:
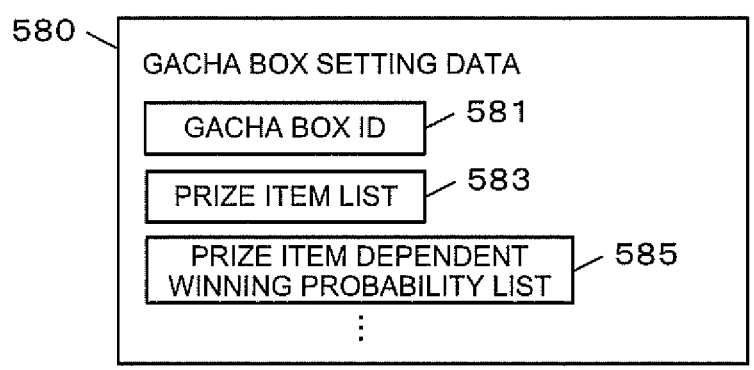
FIG. 23 is a diagram illustrating an example of a data structure of gacha box setting data.

Referring back to FIG. 12, the gacha box setting data 580 is prepared for each "gacha" that the users can use in relation to the game, and includes various kinds of data that defines content of the gacha. One gacha box setting data 580 includes, as illustrated in FIG. 23 for example, a unique gacha box ID 581, a prize item list 583 that is a list of item types to be given as prizes, and a prize item dependent winning probability list 585 that defines a winning probability for each prize. In a configuration in which the winning probability for each type of prize is practically determined based on a number of prizes of the identical types registered in the prize item list 583, the prize item dependent winning probability list 585 may be omitted as appropriate.

Referring back to FIG. 12, the adjustment support reservation data 590 is generated every time when the execution of the item use quantity adjustment support is determined, or every time when the execution of the so-called item giving in the present embodiment is determined, and includes various data for defining the content of the item giving to be executed. The adjustment support reservation data 590 is executed at a timing appropriate for the item giving (the predetermined acquiring opportunity which is determined as the acquirable opportunity of the item) in order, and then deleted. One adjustment support reservation data 590 includes, for example, an adjustment target item type that represents the item to be given, a giving quantity, and an adopted adjusting method that represents a kind of an adopted adjusting method. Note that information other than these may be included as appropriate.

Figure 24:
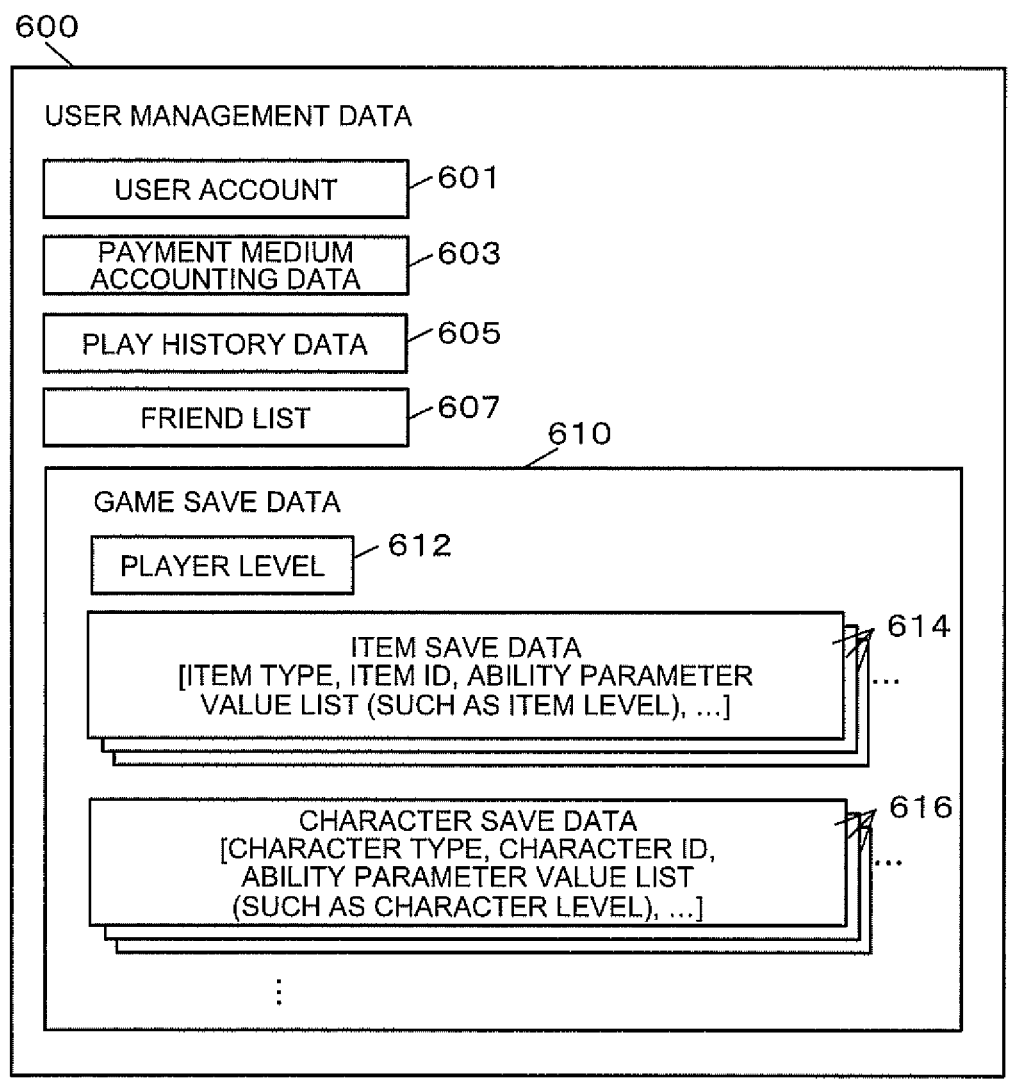
FIG. 24 is a diagram illustrating an example of a data structure of user management data.

The user management data 600 is prepared for each registered user, and includes various types of data associated with a unique identification information, namely, an account. In the present embodiment, as illustrated in FIG. 24, for example, one of the user management data 600 includes a unique user account 601, payment medium accounting data 603, play history data 605, a friend list 607, and game save data 610. Note that data other than these can be included as appropriate.

The payment medium accounting data 603 serves as what is known as an account book storing therein information on a charged/consumed amount (of specified parameter values, such as virtual currency, game currency, specified items, or vitality) of the payment medium for electronic payment associated with the user, information on a reason for the charging/consumption, and information on changed date and time in association with one another. The payment medium accounting data 603 can also be referred to as charge history data or charge information.

The play history data 605 is data in which the past game played timings are stored in time series, and is automatically updated at a log-in/log-out timing. An operation input log as to what operation input has been performed may be included as appropriate. The play history data 605 can provide not only statistical values such as total play time and an average value for each play of the user, but also a play frequency or the like.

The friend list 607 is a list of user accounts of other users that the user has acknowledged and registered as friends. The number of friends related to the user corresponds to the number of user accounts in the list.

The game save data 610 includes various kinds of data describing results of the previous and earlier gameplay and game progress states. For example, the game save data 610 includes a player level 612 that is automatically set according to the play results, item save data 614, and character save data 616. Note that data other than these can be included as appropriate.

The item save data 614 is prepared for each item possessed by the user, and includes various kinds of data related to the item at a saved timing. One item save data 614 includes an item type, a unique item ID, effect and ability of the item, and an ability parameter value that defines status (for example, an item level representing an item growth degree, a enhancing rate of fighting strength, a number of remaining bullets, a degradation level, a recovery state, and the like). Note that data other than these can be included as appropriate.

The character save data 616 is prepared for each character (one that can be used as the player character 4) possessed by the user, and includes various kinds of data related to the character. One character save data 616 includes, for example, a character type, a unique character ID, and an ability parameter value list. Note that data other than these can be included as appropriate.

Referring back to FIG. 12, the play data 700 is prepared for each login using the user terminal 1500, that is, for each login player, and includes various kinds of data required for execution and control of the gameplay, the item transactions, and the item fusions. For example, the play data 700 includes various information related to the user account representing the user serving as the player, a terminal IP address serving as information for communicating with the user terminal 1500, control data of each character or the like, display of the game screen, game results, and the like. Note that data other than these can be included as appropriate.

Figure 25:
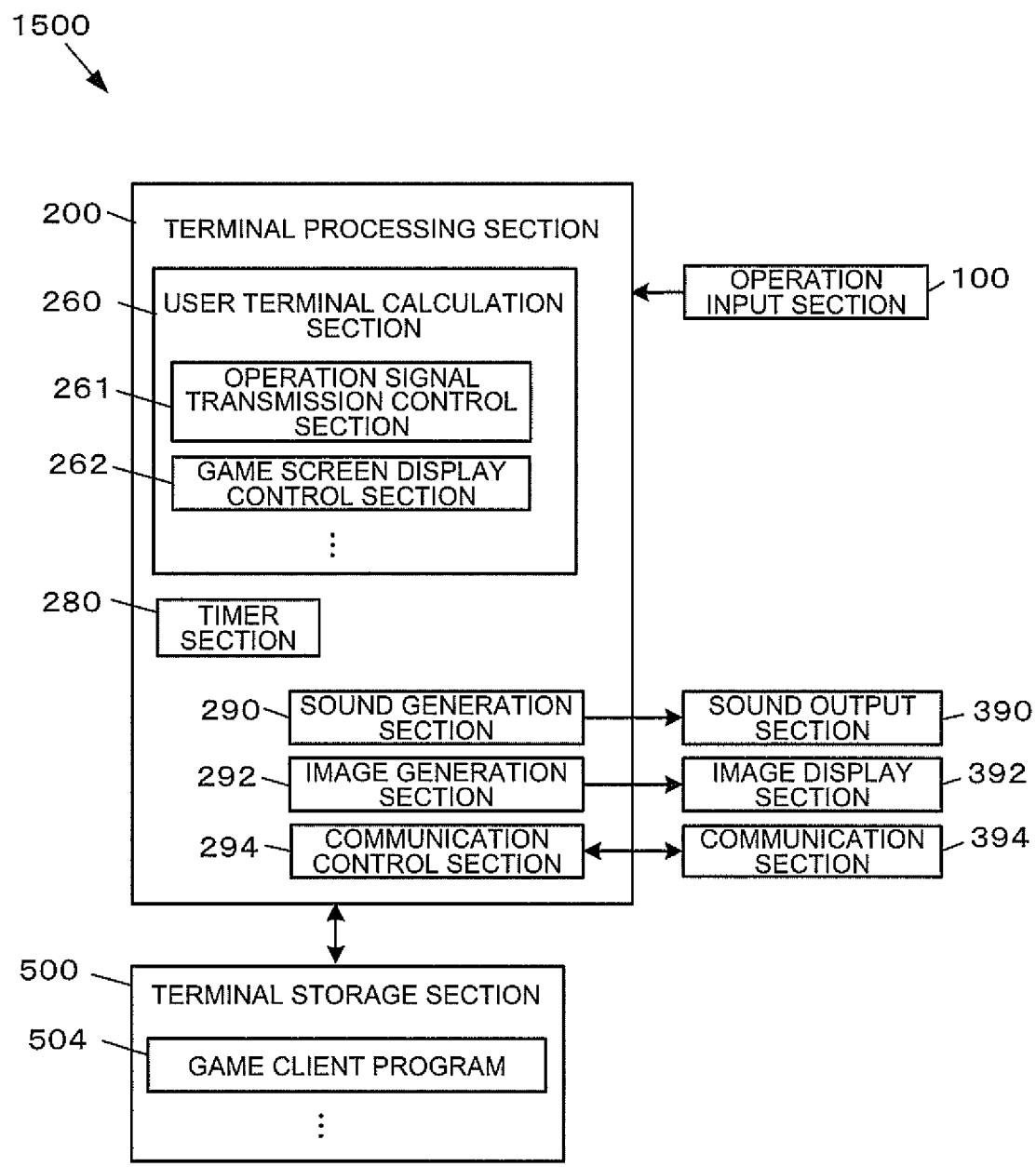
FIG. 25 is a functional block diagram illustrating an example of a functional configuration of the user terminal.

FIG. 25 is a functional block diagram illustrating an example of a functional configuration of the user terminal 1500 according to the present embodiment. The user terminal 1500 according to the present embodiment includes an operation input section 100, a terminal processing section 200, a sound output section 390, an image display section 392, a communication section 394, and a terminal storage section 500. The operation input section 100 outputs an operation input signal, based on various operations input by the player, to the terminal processing section 200. The operation input section 100 can be implemented with a push switch, a joystick, a touch pad, a track ball, an accelerometer, a gyro, a CCD module, or the like. The operation input section 100 corresponds to the arrow key 1502, the button switch 1504, and the touch panel 1506 in FIG. 2.

The terminal processing section 200 is implemented with electronic parts, such as a microprocessor (e.g., CPU and GPU), an ASIC, and an IC memory. The terminal processing section 200 performs input/output control to exchange data with each of the functional sections including the operation input section 100 and the terminal storage section 500. The terminal processing section 200 executes various calculation processes based on a predetermined program or data, the operation input signal from the operation input section 100, and various kinds of data received from the server system 1100 to control the operation of the user terminal 1500. The terminal processing section 200 corresponds to the control board 1550 in FIG. 2. The terminal processing section 200 according to the present embodiment includes a user terminal calculation section 260, a timer section 280, a sound generation section 290, an image generation section 292, and a communication control section 294.

The user terminal calculation section 260 includes an operation signal transmission control section 261, and a game screen display control section 262.

The operation signal transmission control section 261 performs a process of transmitting various kinds of data and a request to the server system 1100 in accordance with an operation on the operation input section 100.

The game screen display control section 262 performs a control for displaying a game screen based on various data received from the server system 1100. In the present embodiment, the game screen display control section 262 is configured to generate game space images (for example, 3DCG images and others) in the server system 1100, but can be configured to generate the game space images in the user terminal 1500. In this case, the game screen display control section 262 is in charge of controlling an object disposed in a virtual three-dimensional space for generating a 3DCG for example.

The sound generation section 290 is implemented with a processor, such as a DSP or a sound synthesizing IC, an audio codec capable of reproducing a sound file, or the like. Based on a processing result by the game screen display control section 262, the sound generation section 290 generates a sound signal for sound effects, a BGM, various operation sounds, and the like related to the game, and outputs the sound signal thus generated to the sound output section 390.

The sound output section 390 is implemented with a device that outputs sound such as sound effects or BGM, based on the sound signal received from the sound generation section 290. The sound output section 390 corresponds to the speaker 1510 in FIG. 2.

The image generation section 292 is implemented, for example, with a processor (e.g., a GPU or a DSP), a video signal IC, a program (e.g., video codec), a drawing frame IC memory (e.g., frame buffer), and the like.

The image generation section 292 generates an image of one game screen in every frame (e.g., 1/60th of a second) based on the various kinds of data received from the server system 1100, and outputs the generated image signal of the game screen to the image display section 392.

The image display section 392 displays various game images based on the image signals input from the image generation section 292. The image display section 392 can be implemented with an image display device, such as a flat panel display, a cathode ray tube (CRT), a projector, or a head-mounted display. In the present embodiment, the image display section 392 corresponds to the touch panel 1506 in FIG. 2.

The communication control section 294 performs a data process for data communication, and exchanges data with an external device through the communication section 394. The communication section 394 connects to the communication line 9 to implement communication. For example, the communication section 394 is implemented with a transceiver, a modem, a TA, a jack for a communication cable, a control circuit, and the like, and corresponds to the wireless communication module 1553 in FIG. 2.

The terminal storage section 500 stores therein a program for implementing various functions for causing the terminal processing section 200 to entirely control the user terminal 1500, various kinds of data, and the like. The terminal storage section 500 is used as a work area for the terminal processing section 200, and temporarily stores a result of calculation performed by the terminal processing section 200 in accordance with various programs, input data received from the operation input section 100, and the like. These functions are implemented with an IC memory (e.g., RAM and ROM), a magnetic disk (e.g., hard disk), an optical disk (e.g., CD-ROM and DVD), or the like. The terminal storage section 500 corresponds to the IC memory 1552 and the memory card 1540 in the control board 1550 FIG. 2.

The terminal storage section 500 according to the present embodiment stores therein a game client program 504. Note that programs and data other than these can be stored as appropriate.

The game client program 504 is an application software that implements a function of the user terminal calculation section 260 when read and executed by the terminal processing section 200. In the present embodiment, the game client program 504 is a copy of the distributed game client program 505 (see FIG. 12) provided from the server system 1100.

The game client program 504 may be an exclusive client program or include a web browser program and a plugin that implements an interactive image display, depending on a technique and a method for implementing an online game.

Operations

Next, a flow of a process related to the item use quantity adjustment support in the server system 1100 is described. The flow of the process as described herein is implemented with the server processing section 200s executing the server program 501. The player is assumed to have completed the user registration and has possessed the game elements such as the player character 4 and the item 7.

Figure 26:
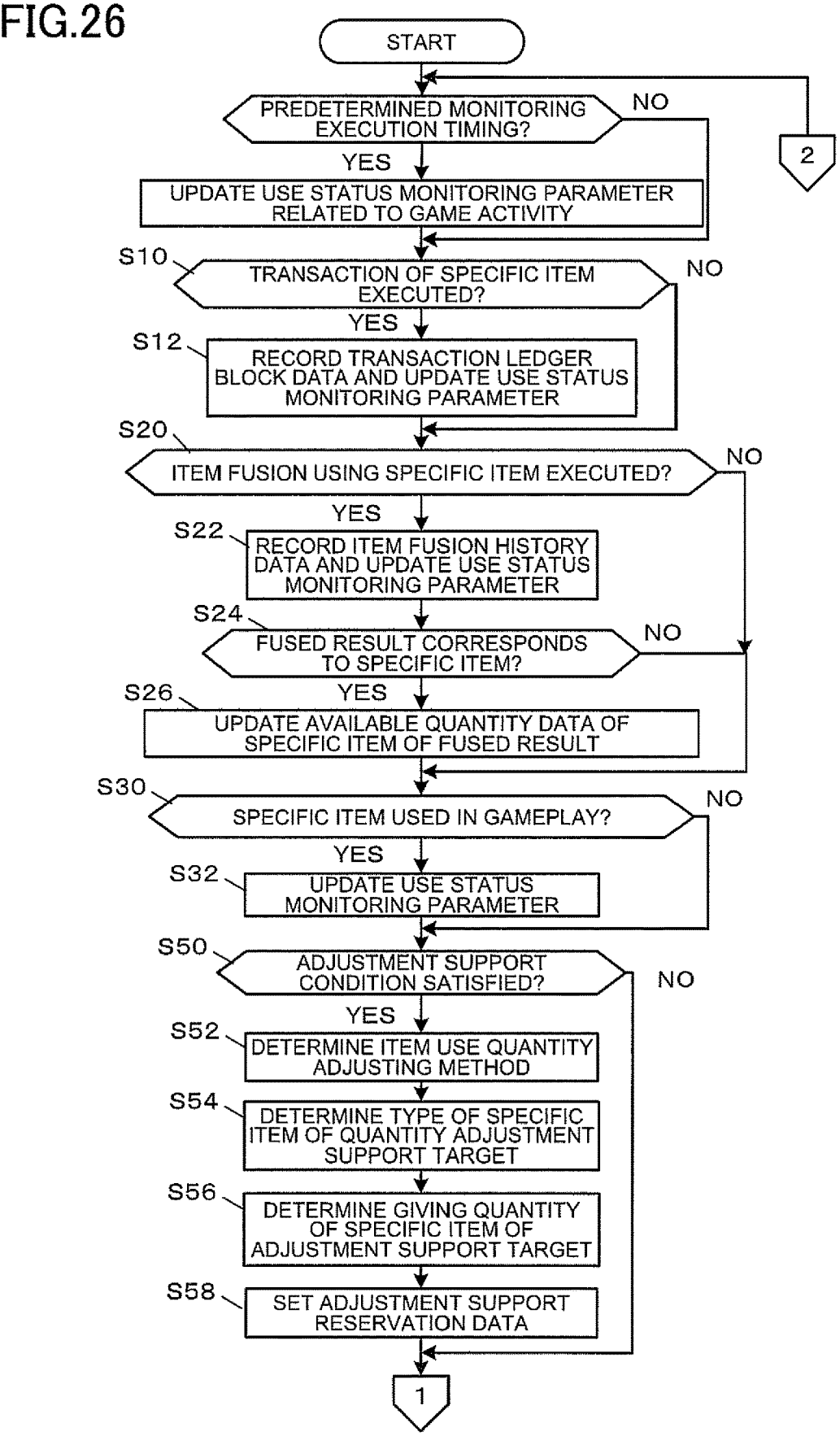
FIG. 26 is a flowchart illustrating a flow of a process in the server system.
Figure 27:
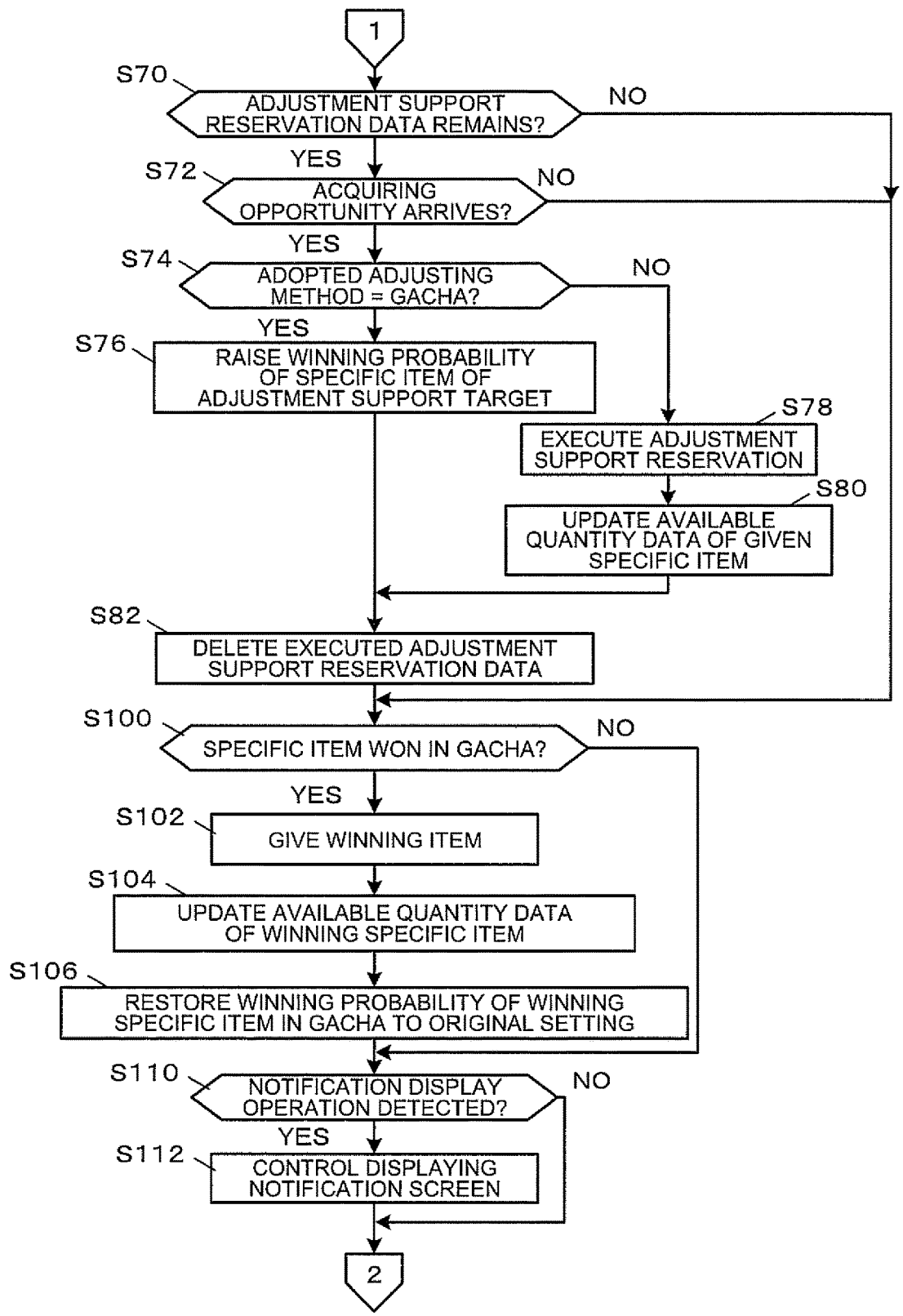
FIG. 27 is a flowchart continued from FIG. 26.

FIGS. 26 and 27 are flowcharts illustrating a flow of a process in the server system 1100 according to the present embodiment. Description of the online shopping is omitted.

First of all, the server system 1100 determines whether a predetermined monitoring execution timing has arrived (step S4). For example, the determination may be performed at a predetermined interval such as once a day. Alternatively, the determination may be performed at every time of user login. When it is determined that the monitoring execution timing has arrived (YES in step S4), the server system 1100 determines the game activity. That is, the use status monitoring parameters related to the game activity (the registered user count 576a to the skilled player ratio 576h in FIG. 22) are updated (step S6).

Next, the server system 1100 determines whether any item transaction related to the specific item has concluded (step S10). In the present embodiment, the server system 1100 provides the system for the item transaction. Thus, when the transacted item is the specific item, it is determined that this step is affirmative.

Then, when the determination result is affirmative (YES in step S10), the server system 1100 records the transaction ledger block data 563 (see FIG. 21), and updates the use status monitoring parameter 570 (see FIG. 21) so as to reflect the transaction result of this time (step S12).

Meanwhile, the server system 1100 also functions as the node 1201 of the block chain system 1200. Thus, the server system 1100 may perform the determination in step S10 by means of that the transaction ledger block data 563 (see FIG. 21) in the specific item use status base data 560 is recorded when the item transaction is performed. In such a case, when the transacted item in the newly updated transaction ledger block data 563 is the specific item, it is determined that step S10 is affirmative. Considering the order of the process, recording the transaction ledger block data 563 in step S12 is omitted.

Furthermore, when the item fusion including the specific item as material or a result of the fusion is executed (YES in step S20), the server system 1100 generates and records the item fusion history data 565 (see FIG. 21) and updates the use status monitoring parameter 570 so as to reflect the fusion result of this time (step S22).

When the specific item is newly generated as a result of the fusion of this time (YES in step S24), the server system 1100 updates the available quantity data 561 (see FIG. 21) of the specific item (step S26).

Furthermore, when the server system 1100 detects use of the specific item in the gameplay (YES in step S30), specifically when the server system 1100 detects that the specific item is newly equipped to the player character 4 due to a change of equipment, or that the specific item is used by arbitrary item use operation in the gameplay, the server system 1100 updates the use status monitoring parameter 570 so as to reflect the detected item use of this time (step S32).

Furthermore, the server system 1100 refers to the item use quantity adjustment pattern definition data 520 (520a, 520b, and so on: see FIGS. 14 to 19) at a predetermined interval, and determines whether the adjustment support conditions 521 to 526 are satisfied (step S50).

Then, when any of the pattern definition data satisfies the adjustment support conditions 521 to 526, the server system 1100 determines the adjusting method to be adopted based on the adjusting method setting 530 of the pattern definition data (step S52), and determines the type of the specific item to be the adjustment support target based on the adjustment support target setting 532 (532a, 532b, and so on) (step S54).

Furthermore, the server system 1100 determines the giving quantity using the giving quantity calculation function 534 of the pattern definition data (step S56), and creates a new adjustment support reservation data 590 (step S58: see FIG. 12).

Referring to FIG. 27, when any of the adjustment support reservation data 590 remains (YES in step S70), and when the predetermined item acquiring opportunity arrives (YES in step S72), the server system 1100 executes the remaining adjustment support reservation data 590.

In other words, the server system 1100 refers to the adjustment support reservation data 590, and when the adopted adjusting method is set to the "gacha" (YES in step S74), the server system 1100 updates the gacha box setting data 580 (see FIGS. 12 and 23) so as to raise the winning probability of the specific item of the adjustment support target (step S76). At this time, the server system 1100 may add the specific item of the adjustment support target to the prize item lists 583 and update the prize item dependent winning probability lists 585 in all the gacha box setting data 580. Alternatively, this process may be executed only on the gacha box setting data 580 having the prize item list 583 including the specific item of the adjustment support target.

When the adopted adjusting method in the adjustment support reservation data 590 to be executed is set to the method other than the "gacha" (NO in step S74), the server system 1100 newly adds the specific item of the adjustment support target to the game according to the definitions of the adjustment support reservation data 590 (step S78). Then the server system 1100 updates the available quantity data 561 (see FIG. 21) of the increased specific item so as to reflect the increase of this time (step S80). That is, the server system 1100 directly gives the specific item of the adjustment support target to the player, mixes it with prizes of the gacha so that the specific item is given to the player sometime or other, or deploys the specific item in the game space (for example, hides it in a treasure chest) so that the player who finds it can acquire it.

Then, after executing the increase of the item use quantity, the server system 1100 deletes the adjustment support reservation data 590 that is a basis of the execution (step S82).

When the server system 1100 detects that any one of the players has executed the gacha and the player has won the specific item (YES in step S100), the server system 1100 gives the player the specific item won by the player (step S102). Specifically, the server system 1100 adds a new item save data 614 (see FIG. 24) to the game save data 610 of the user management data 600 of the player.

Then, the server system 1100 updates the available quantity data 561 of the specific item won by the player (step S104), and restores the winning probability of the specific item to the original setting (step S106). That is, when specific gacha box setting data 580 has been changed in step S76, the process to restore the winning probability of the specific item won by the player may be performed only on the specific gacha box setting data 580. When all the gacha box setting data 580 has been changed in step S76, the process to restore the winning probability of the specific item won by the player is performed on all the gacha box setting data 580.

Next, when the server system 1100 receives a predetermined operation to display the notification from the user terminal 1500 (YES in step S110), the server system 1100 performs a process to cause the user terminal 1500 to display the notification screen W4 (see FIG. 10) related to the item use quantity adjustment support (step S112).

Specifically, the server system 1100 calculates sufficiency rates of the adjustment support conditions 521 to 526 for each of the item use quantity adjustment pattern definition data 520 (see FIGS. 14 to 19), and displays the items of a predetermined number in a descending order of the sufficiency rates on the notification screen W4.

As described above, according to the present embodiment, use status and a use quantity of an item can be monitored. When a giving condition is satisfied, the item can be given to a user at a predetermined acquiring opportunity. Thus, a technique to support automatic adjustment of the use quantity of the item can be provided.

That is, in a game in which the user can selectively use an item (the possessed object such as the character that can be used as the player character 4 and the item 7 in the present embodiment), item transactions, item fusions, and item use in a gameplay are important elements to enjoy the game. Especially, it can be said that the transactions, fusions, and use of a special item (the specific item in the present embodiment) having high rarity or the like are great pleasures.

Accordingly, if the specific item is in short supply, it would be impossible to sufficiently provide the user with such pleasures. On the contrary, if the specific item is appropriately added to the game according to the use status of the specific item, opportunities to improve the use quantity of the item can be increased. While the user enjoys actively making transactions of the specific item with other users, using the specific item for the item fusion, and using the specific item in the gameplay, the opportunities for the user to gain the same pleasures gradually increase accordingly. Thus, it is possible to make the user always enjoy the game, and provide the user with a motivation to play the game longer and more frequently.

Modifications

The embodiments to which the present disclosure is applied have been described above. Note that the present disclosure is not limited thereto. Various modifications may be made as appropriate, such as adding other elements, omitting some of the elements, or changing some of the elements.

For example, it is possible to add a configuration for managing a maximum value of a total available quantity of the specific item to the embodiment described above. Specifically, the maximum value (of the total available quantity) is included in the available quantity data 561 (see FIG. 21). Then, when the total available quantity reaches the maximum value, the item fusion is controlled such that the specific item does not appear as a result of the fusion. For example, it is controlled such that the fusion turns out to be a failure, or another specific item appears. In addition, as for the specific item, the total available quantity of which reaches the maximum value, it is controlled such that the enemy character 6 cannot leave it as the drop, or it is not given as the prize of the gameplay. Meanwhile, when the specific item, the total available quantity of which reaches the maximum value, is given, the maximum value may be raised accordingly.

Furthermore, in the embodiment described above, as an example of the possessed objects such as the item and the character that can be used as the player character, both of the character that can be used as the player character 4 and the item 7 are illustrated, and the description is representatively given in view of the item 7, however, only any one of them may be adopted depending on the content of the game. Furthermore, a game element corresponding to the item in the present embodiment may be something else depending on the content of the game. For example, the game element may be a character that can be used as an accompanying non player character (NPC), a map, an event, a stage, a mission, and the like.

What is claimed is:

1. A computer system comprising:
at least one processor or circuit programmed to:
monitor a use status of a game element possessed by a user so as to monitor a use quantity of the game element in a game played on a user terminal, the game element being an item and/or a character; and
perform a use quantity adjustment support control including:
controlling whether to give the game element to the user at a predetermined acquiring opportunity via a giving condition based on the use quantity of the game element, the predetermined acquiring opportunity: (i) being determined as an acquirable opportunity of the game element in the game, and (ii) including an opportunity to execute a lottery,
controlling whether to give a specific game element at the predetermined acquiring opportunity so as to perform the use quantity adjustment support control related to the specific game element, and
changing a winning probability of the specific game element in the lottery so as to perform the use quantity adjustment support control related to the specific game element.

2. The computer system as defined in claim 1, wherein the at least one processor or circuit is programmed to further execute controlling a transaction of game elements between a plurality of users based on operation input by the plurality of users,
wherein the monitoring of the use quantity includes monitoring the use status including the transaction, and
wherein the use quantity adjustment support control includes performing the use quantity adjustment support control with at least one of the game elements that have been targets of the transaction as a control target.

3. The computer system as defined in claim 1, wherein the at least one processor or circuit is programmed to further execute controlling a fusion of game elements possessed by the user based on operation input by the user, wherein the monitoring of the use quantity includes monitoring the use status including the fusion, and wherein the use quantity adjustment support control includes performing the use quantity adjustment support control with at least one of the game elements that have been targets of the fusion as a control target.

4. The computer system as defined in claim 1,
wherein the monitoring of the use quantity includes monitoring the use status including whether each game element possessed by the user has been used in a gameplay, and wherein the use quantity adjustment support control includes performing the use quantity adjustment support control with the game element used in the gameplay as a control target.

5. The computer system as defined in claim 1,
wherein the monitoring of the use quantity includes monitoring the use status of a specific game element among game elements, and monitoring the use quantity of the specific game element, and wherein the use quantity adjustment support control includes controlling whether to give the specific game element at the acquiring opportunity.

6. The computer system as defined in claim 1, wherein the use quantity adjustment support control includes changing the winning probability of the specific game element per execution of the lottery, or changing the winning probability of the specific game element in the lottery by performing a control for changing a number of specific game elements to be included in winning candidates.

7. The computer system as defined in claim 5, wherein the acquiring opportunity includes a timing when game progress reaches a predetermined pause timing.

8. The computer system as defined in claim 5,
wherein the specific game element includes a first specific game element and a second specific game element,
wherein the monitoring of the use quantity includes monitoring respective use quantities of the first specific game element and the second specific game element, and
wherein the use quantity adjustment support control includes performing the use quantity adjustment support control in which the giving condition based on the use quantity of the first specific game element and the giving condition based on the use quantity of the second specific game element are different.

9. The computer system as defined in claim 1,
wherein the specific game element includes a first specific game element and a second specific game element,
wherein the monitoring of the use quantity includes monitoring respective use quantities of the first specific game element and the second specific game element, and
wherein the use quantity adjustment support control includes performing the use quantity adjustment support control in which the giving condition based on the use quantity of the first specific game element and the giving condition based on the use quantity of the second specific game element are different.

10. The computer system as defined in claim 6,
wherein the specific game element includes a first specific game element and a second specific game element,
wherein the monitoring of the use quantity includes monitoring respective use quantities of the first specific game element and the second specific game element, and wherein the use quantity adjustment support control includes performing the use quantity adjustment support control in which the giving condition based on the use quantity of the first specific game element and the giving condition based on the use quantity of the second specific game element are different.

11. The computer system as defined in claim 1,
wherein the at least one processor or circuit is programmed to further execute determining game activity based on at least any one of a player level, play time, a play frequency, a number of types of game elements in possession, and a number of game elements in possession, of each of the users, and
wherein the use quantity adjustment support control includes performing the use quantity adjustment support control with the game activity included in the giving condition.

12. The computer system as defined in claim 11, wherein the determination of the game activity includes determining the game activity further using statistical information of users.

13. The computer system as defined in claim 1, wherein the at least one processor or circuit is programmed to further execute a control for notifying the user of the use quantity.

14. The computer system as defined in claim 1, wherein the use quantity adjustment support control further includes controlling a giving quantity of the game element when the game element is given.

15. The computer system as defined in claim 1, wherein the use quantity adjustment support control includes a control for giving a game element associated with the game element of a monitoring target based on the use quantity.

16. The computer system as defined in claim 1, wherein the at least one processor or circuit is programmed to further execute managing operation input related to the game by each of the users by a predetermined block chain process.

17. A game system comprising:
a user terminal on which the user performs operation input related to the game; and
a server system that is the computer system as defined in claim 1,
the user terminal and the server system being configured to connect to each other to perform communication.

18. A method that is implemented by at least one processor and/or circuit, the method comprising:
monitoring a use status of a game element possessed by a user so as to monitor a use quantity of the game element in a game played on a user terminal, the game element being an item and/or a character; and
performing a use quantity adjustment support control including:
controlling whether to give the game element to the user at a predetermined acquiring opportunity via a giving condition based on the use quantity of the game element, the predetermined acquiring opportunity: (i) being determined as an acquirable opportunity of the game element in the game, and (ii) including an opportunity to execute a lottery,
controlling whether to give a specific game element at the predetermined acquiring opportunity so as to perform the use quantity adjustment support control related to the specific game element, and
changing a winning probability of the specific game element in the lottery so as to perform the use quantity adjustment support control related to the specific game element.

19. A computer system comprising:

at least one processor or circuit programmed to:
- monitor a use status of a game element possessed by a user so as to monitor a use quantity of the game element in a game played on a user terminal, the game element being an item and/or a character;
- perform a use quantity adjustment support control including:
  - controlling whether to give the game element to the user at a predetermined acquiring opportunity via a giving condition based on the use quantity of the game element, the predetermined acquiring opportunity being determined as an acquirable opportunity of the game element in the game; and
- manage an operation input related to the game by each of the users by a predetermined block chain process.

20. The computer system according to claim 19, wherein:
the use quantity adjustment support control includes controlling whether to give a specific game element at the acquiring opportunity so as to perform the use quantity adjustment support control related to the specific game element, the acquiring opportunity includes an opportunity to execute a lottery, the use quantity adjustment support control includes changing a winning probability of the specific game element in the lottery so as to perform the use quantity adjustment support control related to the specific game element, and the use quantity adjustment support control includes changing the winning probability of the specific game element per execution of the lottery, or changing the winning probability of the specific game element in the lottery by performing a control for changing a number of specific game elements to be included in winning candidates.

21. The computer system according to claim 20, wherein:
the specific game element includes a first specific game element and a second specific game element, the monitoring of the use quantity includes monitoring respective use quantities of the first specific game element and the second specific game element, and the use quantity adjustment support control includes performing the use quantity adjustment support control in which the giving condition based on the use quantity of the first specific game element and the giving condition based on the use quantity of the second specific game element are different.

22. A method that is implemented by at least one processor and/or circuit, the method comprising:
- monitoring a use status of a game element possessed by a user so as to monitor a use quantity of the game element in a game played on a user terminal, the game element being an item and/or a character;
- performing a use quantity adjustment support control including:
  - controlling whether to give the game element to the user at a predetermined acquiring opportunity via a giving condition based on the use quantity of the game element, the predetermined acquiring opportunity being determined as an acquirable opportunity of the game element in the game; and
- managing an operation input related to the game by each of the users by a predetermined block chain process.

* * * * *